(12) United States Patent
Yamazaki

(10) Patent No.: US 8,779,269 B2
(45) Date of Patent: Jul. 15, 2014

(54) MUSIC CONTENT DISPLAY APPARATUS AND METHOD

(71) Applicant: Yamaha Corporation, Hamamatsu (JP)

(72) Inventor: Takuma Yamazaki, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 13/845,965

(22) Filed: Mar. 18, 2013

(65) Prior Publication Data

US 2013/0247746 A1    Sep. 26, 2013

(30) Foreign Application Priority Data

Mar. 21, 2012    (JP) .................................. 2012-063272

(51) Int. Cl.
- A63H 5/00    (2006.01)
- G04B 13/00    (2006.01)
- G10H 7/00    (2006.01)

(52) U.S. Cl.
USPC .............................................. 84/609; 84/615

(58) Field of Classification Search
USPC .......................................... 84/609, 615, 634
See application file for complete search history.

(56) References Cited

U.S. PATENT DOCUMENTS

| | | | | |
|---|---|---|---|---|
| 5,400,687 | A | * | 3/1995 | Ishii ............................ 84/477 R |
| 6,348,648 | B1 | * | 2/2002 | Connick, Jr. ................ 84/477 R |
| 6,574,625 | B1 | * | 6/2003 | Bates et al. .................... 707/749 |
| 6,768,046 | B2 | * | 7/2004 | Kriechbaum et al. .......... 84/609 |
| 7,119,266 | B1 | * | 10/2006 | Bittner et al. ............... 84/477 R |
| 7,612,278 | B2 | * | 11/2009 | Sitrick et al. .................... 84/609 |
| 2002/0144586 | A1 | * | 10/2002 | Connick, Jr. .................... 84/478 |
| 2004/0040433 | A1 | * | 3/2004 | Errico ......................... 84/477 R |

FOREIGN PATENT DOCUMENTS

JP    2007249033 A    9/2007

* cited by examiner

*Primary Examiner* — Jeffrey Donels

(74) *Attorney, Agent, or Firm* — Rossi, Kimms & McDowell LLP

(57) ABSTRACT

A storage section stores therein a plurality of music content items each including image data of one or more pages. An order is determined of two or more of the music content items stored in the storage section. Page information designating a page to be displayed is acquired, for example, in response to a user's operation. By reference to the storage section, a page arrangement is specified which is indicative of a state in which the image data of the ordered two or more music content items are arranged in a consecutive fashion in accordance with the determined order. A page designated by the acquired page number information is identified in the specified page arrangement. Image data of the acquired page is displayed on a display.

23 Claims, 12 Drawing Sheets

(a) TABLE-OF-CONTENTS PAGE

| MUSIC PIECE NAME | PAGE | | |
|---|---|---|---|
| 1. 01 AAA | P.1 | (4 PAGES IN TOTAL) | ← Hi |
| 2. 02 BBB | P.5 | (3 PAGES IN TOTAL) | ← Hi |
| 03 XXX | | | ← Dk |
| 3. 04 CCC | P.8 | (2 PAGES IN TOTAL) | ← Hi |
| 4. 05 YYY | P.10 | (5 PAGES IN TOTAL) | ← Hi |
| 06 ZZZ | | | ← Dk |

Sc ↑ ↑ ↑ ↑
  Od  Ni  Pn  Pt (b) WHEN DISPLAY OF 3RD PAGE IS INSTRUCTED IN PAGE-BY-PAGE DISPLAY MODE

3RD-PAGE IMAGE DATA OF MUSIC CONTENT DISPLAY DATA SET OF "01 AAA"

– p.3 – ← Pn

Sc (c) WHEN DISPLAY OF 7TH PAGE IS INSTRUCTED IN TWO-PAGE SPREAD DISPLAY MODE

| 3RD-PAGE IMAGE DATA OF MUSIC CONTENT DISPLAY DATA SET OF "02 BBB" | 1ST-PAGE IMAGE DATA OF MUSIC CONTENT DISPLAY DATA SET OF "04 CCC" |
|---|---|
| – p.7 – ← Pn | – p.8 – ← Pn |

Sc

⇩ FURTHER PAGE TURNING "TO THE NEXT"

| 2ND-PAGE IMAGE DATA OF MUSIC CONTENT DISPLAY DATA SET OF "04 CCC" | 1ST-PAGE IMAGE DATA OF MUSIC CONTENT DISPLAY DATA SET OF "05 YYY" |
|---|---|
| – p.9 – ← Pn | – p.10 – ← Pn |

Sc

F I G. 4

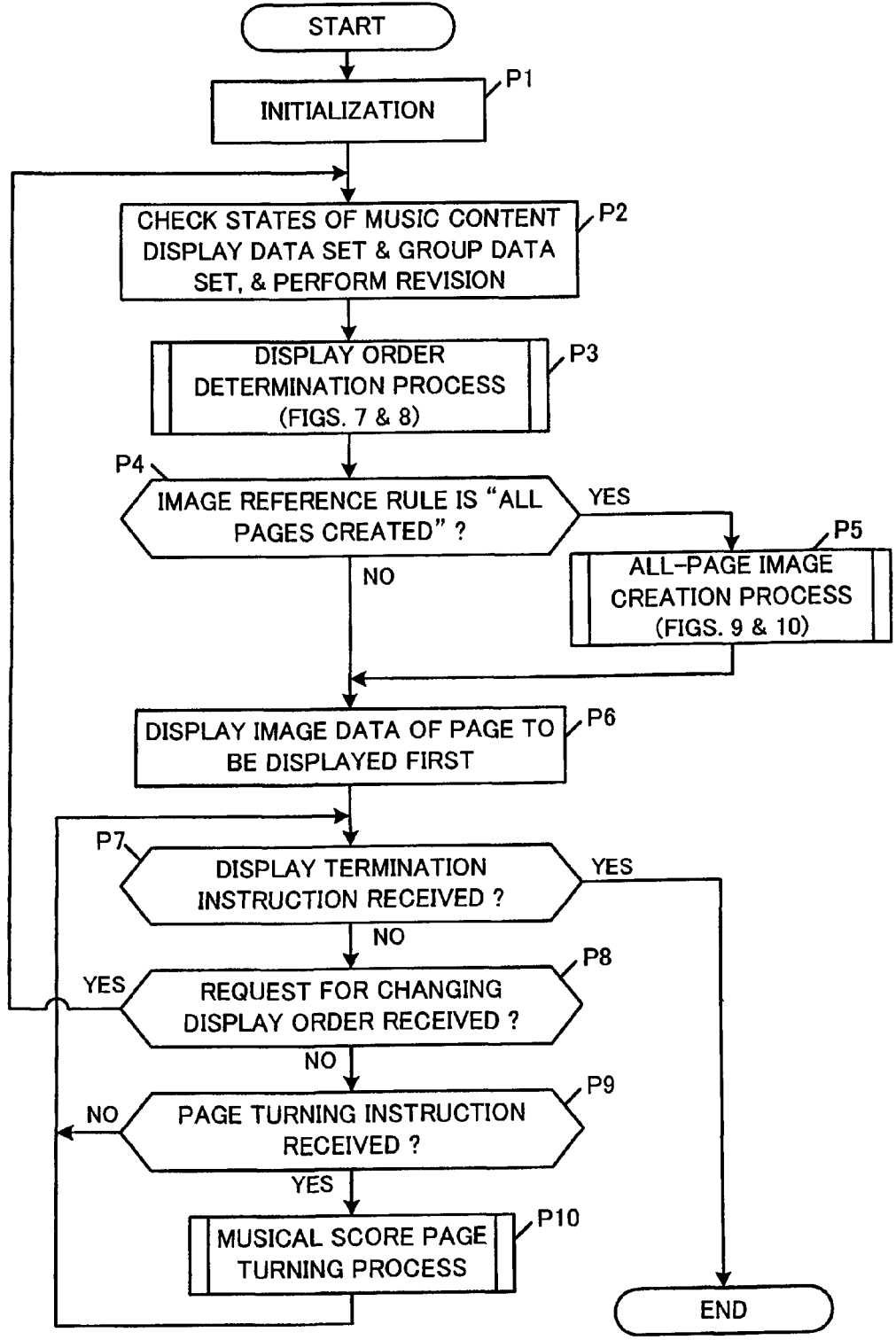
F I G. 6

MUSIC CONTENT DISPLAY APPARATUS AND METHOD

The present invention relates generally to music content display systems which display music-piece-related music content, such as musical score display data.

BACKGROUND

Heretofore, there have been known display apparatus capable of displaying music content, such as musical score display data related to a user-desired music piece. For example, an electronic musical instrument disclosed in Japanese Patent Application Laid-open Publication No. 2007-249033 includes a keyboard, a foot switch, a display screen, an external storage device, a communication interface (I/F), a tone generator circuit, an effect circuit, a sound system, etc., and it can display a musical score in accordance with a musical score data set of a music piece selected through a user's operation. Page turning of the displayed musical score is effected through an operation of a foot switch. Among examples of the musical score display data set, i.e. musical score data set, are ones generated from performance data of a corresponding music piece, ones generated on the basis of musical score logic data of a corresponding music piece read out from a storage device, and ones obtained by reading out, from a storage device, musical score image data themselves of a corresponding music piece.

However, in the prior art technique, musical score data sets are prepared in advance on a per-music-piece basis, and thus, when a user wants to display a musical score of another music piece different from the last one, the user has to perform an operation for selecting the other music piece. Namely, with the prior art technique, the user cannot view musical scores of a plurality of music pieces in a consecutive fashion. Further, in a case where displayable musical score data sets and non-displayable musical score data sets exist in a mixture, the user has to check, when instructing display of a given musical score, whether the given musical score is displayable or not. For example, in a case where the use can display a desired musical score only after the user acquires a corresponding musical score data set as by downloading and carries out a separate procedure for acquiring a license to use the acquired musical score data set, the user cannot display the musical score by merely downloading the musical score data set although the musical score data set is in his or her hand. In another case, an electronic musical instrument may have pre-stored therein musical score data sets compatible with the musical instrument, but any one of the musical score data sets cannot be displayed before information that the electronic musical instrument is one duly purchased is input (recognized). In such a case, the user can know all of the stored musical score data sets, for example, by displaying a list of the stored musical score data sets, but displayable musical score data sets and non-displayable musical score data sets may exist in the stored musical score data sets.

SUMMARY OF THE INVENTION

In view of the foregoing prior art problems, it is an object of the present invention to provide an improved music content display system which can display, in a consecutive fashion, music content, such as musical score display data sets, of a plurality of desired music pieces without requiring a user to perform a plurality of music piece selection operations.

In order to accomplish the above-mentioned object, the present invention provides an improved music content display apparatus, which comprises: a storage section storing a plurality of music content items, each of the plurality of music content items including image data of one or more pages; an order determination section adapted to determine an order of two or more of the plurality of music content items stored in the storage section: a page number acquisition section adapted to acquire page information designating a page to be displayed; a page identification section adapted to reference the storage section to specify a page arrangement indicative of a state in which the image data of the two or more music content items, whose order has been determined by the order determination section, are arranged in a consecutive fashion in accordance with the determined order, and adapted to identify, in the specified page arrangement, a page designated by the page number information acquired by the page number acquisition section; and a display control section adapted to acquire image data of the page, identified by the page identification section, on the basis of the storage section and display the acquired image data on a display. The following are example correspondency relationship between the elements recited in the claim and elements of a later-described embodiment. Namely, generally, the above-mentioned storage section corresponds to a storage area AR of a storage device 4; the above-mentioned order determination section corresponds to an order determination process performed by a CPU 1 at step P3 of FIG. 6 and specific details of the order determination process shown in FIGS. 7 and 8; the page number acquisition section corresponds to a musical score page turning process performed by the CPU 1 at step P10 of FIG. 6 and specific details of the process shown in FIGS. 13 and 14; the page identification section corresponds to an all-page image creation process performed by the CPU 1 at step P5 of FIG. 6 and operations performed by the CPU 1 at steps U7 to U10 of FIG. 16 and operations performed by the CPU 1 at steps R5 to R14 of FIG. 10; and the display control section corresponds to operations performed by the CPU 1 at steps U11 to U13 of FIG. 16, at steps R8 to R12 of FIG. 10 and at step U2 of FIG. 15.

According to the present invention, an order is determined of two or more of the music content items stored in the storage section so that the thus-ordered two or more music content items are grouped into one group, and a consecutive page arrangement of the music content items in the group is specified. A page in the specified page arrangement is identified in accordance with the page number information designating a page to be displayed. Namely, the page number information designates a page in the page arrangement within the one group comprising the ordered two or more music content items. Thus, any desired pages of the one group, comprising the ordered two or more music content items, can be designated by the page number information as if the one group is a single book, and image data of the designated page can be displayed. Thus, the user can cause images of individual pages of a plurality of desired music content items (e.g., musical score display data sets of music pieces or page-by-page display data sets of these music pieces) to be sequentially displayed in a consecutive fashion in response to the page number information just as if the user is turning pages of a single book, without having to perform operations for separately selecting, item by item, the plurality of desired music content items. In this way, the present invention can display, to the user, musical scores of a plurality of music pieces in a consecutive fashion as if the musical scores are a single album without requiring the user to repetitively perform music piece selecting operations.

In an embodiment of the music content display apparatus of the invention, the display control section may extract the image data of the designated page from the storage section. Such arrangements correspond generally to operations performed in the later-described embodiment at steps U11 to U13 of FIG. 16.

In another embodiment of the music content display apparatus, the display control section may retrieve, from the storage section, the two or more music content items whose order has been determined by the order determination section, create an image data set comprising the image data of the retrieved two or more music content items arranged consecutively in the specified page arrangement and acquire the image data of the identified page from the created image data set. Such arrangements correspond generally to operations performed in the later-described embodiment at steps R8 to R12 of FIG. 10 and step U2 of FIG. 15.

An embodiment of the music content display apparatus may further comprise a determination section adapted to determine a displayable or non-displayable state of each of the music content items stored in the storage section, and the page identification section may specify the page arrangement indicative of a state in which the image data of one or more music content items determined by the determination section to be displayable among the two or more music content items, whose order has been determined by the order determination section, are arranged in a consecutive fashion in accordance with the determined order. Such arrangements correspond generally to operations performed in the later-described embodiment at steps R6 to R12 of FIG. 10 and step U7 of FIG. 16. With the arrangements, the user can view only displayable music content items (music content display data sets) without caring whether the music content items (music content display data sets) are displayable or not.

In an embodiment of the embodiment of the music content display apparatus, the order determination section may include a group data table storing therein one or more group data sets each defining a combination and display order of two or more of the plurality of music content items stored in the storage section, and the order determination section may determine, in accordance with the combination and display order of the two or more music content items defined by one of the group data sets selected from the group data table, an order of the two or more music content items. Such arrangements correspond generally to an operation performed in the later-described embodiment at step Q3 of FIG. 7. With the arrangements, where group data sets, each defining a combination and display order of two or more of the plurality of music content items (music content display data sets) stored in the storage section, are stored in advance, any desired group data can be selected from the stored group data sets in response to a user's operation or selected automatically in accordance with a given rule, which can provide a great convenience of use to the user.

Further, in an embodiment of the embodiment of the music content display apparatus, the order determination section may create, in response to a user's operation, a group data set defining a combination and display order of two or more of the plurality of music content items stored in the storage section, and the order determination section may determine, in accordance with the combination and display order of the two or more music content items defined by the created group data set, an order of the two or more music content items. Such arrangements correspond generally to an operation performed in the later-described embodiment at step Q14 of FIG. 8. With the arrangements, a group data set defining a combination and display order of two or more desired music content items (music content display data sets) can be created, and thus, a personalized music content display can be provided.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 4 is a diagram showing examples of display images displayed in the embodiment;

FIG. 6 is a flow chart showing an example overall operational sequence of music content display processing performed in the embodiment;

DETAILED DESCRIPTION OF THE INVENTION

[Hardware Construction of Music Content Display Apparatus]

Figure 1:
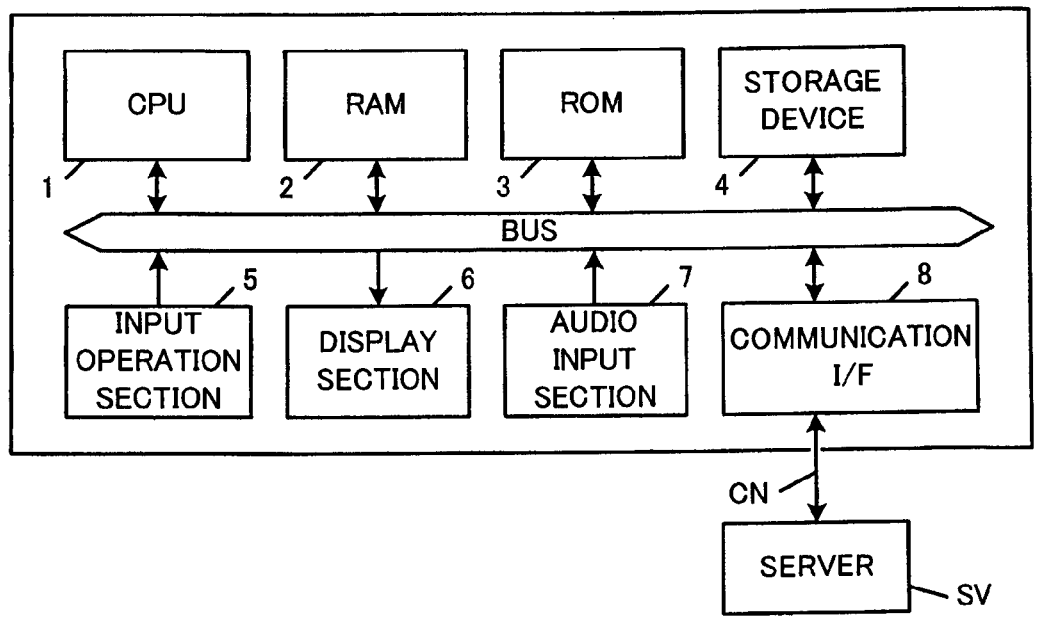
FIG. 1 is a block diagram showing an example hardware construction or setup of a preferred embodiment of a music content display apparatus of the present invention.

FIG. 1 is a block diagram showing an example hardware construction of a preferred embodiment of a music content display apparatus ST of the present invention. The music content display apparatus ST includes, as its hardware components, a central processing unit (CPU) 1, a random access memory (RAM) 2, a read-only memory (ROM) 3, a storage device 4, an input operation section 5, a display 6, an audio input section 7, a communication interface (I/F) 8, etc. These components 1 to 8 are interconnected via a bus 9. Preferably, a tablet (touch panel) type, mobile information processing apparatus is used as the music content display apparatus ST, in which case the input operation section 5 and the display 6 may be implemented by a touch panel.

The CPU 1, which controls general behavior of the music content display apparatus ST, is a processor for controlling various processing, including music content display processing, in accordance with various control programs including a music content display program. The RAM 2 is used to temporarily store or preserve various data necessary for the various processing, and at the time of the music content display processing, a "all-page image storage area" for temporarily storing displaying data called "all-page image data" is provided in the RAM 2. The ROM 3 has prestored therein predetermined control programs and control data.

The storage device 4 includes at least one storage medium, such as a hard disk (HD) or flash memory, and a drive device for driving the storage medium, and various control programs and various data can be stored in a desired storage medium. The storage medium may be either built in the music content display apparatus ST, or detachably attached to the music content display apparatus ST like an external storage medium (e.g., memory card, USB memory, CD-R or the like). Further, applications, such as a music content display program, music content display data sets (Di) and group display data sets (hereinafter referred to as "group data set") (Dg) may be prestored in the storage device 4.

The input operation section 5 detects a user's operation of any one of various operators, such as switches and supplies various information corresponding to the detected operation. The display 6 controls displayed content of a display device, such as an LCD, in accordance with an instruction given from the CPU 1, and it performs display assistance corresponding to various user's operations. Note that functions of the operators and the display device may be integrated together by use of a touch panel. The audio input section 7 includes a microphone and an audio signal input section and is capable of supplying an audio signal, input via the microphone, to a data processing section via the audio signal input section.

The communication I/F 8, which includes, among other things, a musical wired I/F, such as a MIDI, a general-purpose network I/F, such as a USB, and a general-purpose short-distance wireless I/F, such as a wireless LAN, is used for communication with a server SV and the like via a network CN. For example, music content display data (Di), such as musical score display data and music-piece guiding illustration data, can be acquired from the server SV and stored into a predetermined area (AR) of the storage device 4.

[Music Content Display Data and Group Data]

Figure 2:
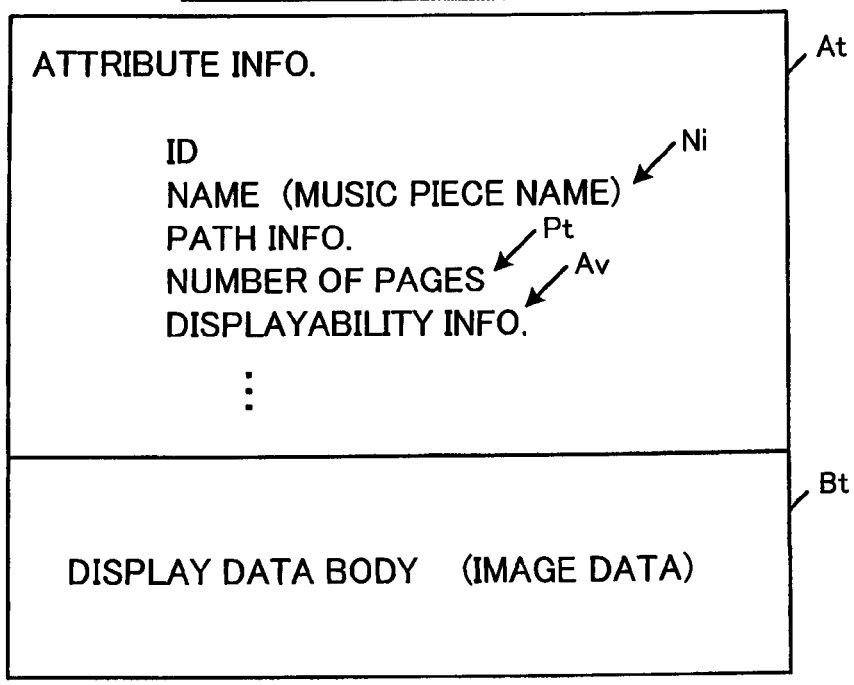
FIG. 2 is a diagram showing an example data structure of a music content display data set used in the embodiment.

In an embodiment of a music content display system of the present invention, a plurality of displaying music content items (i.e., music content display data sets) and one or more group data sets are stored in a predetermined storage area, so that images of the music content display data sets of a plurality of music pieces in a usable state (i.e., displayable state) can be displayed in a consecutive fashion in accordance with the group data set. In an example to be described below, musical score data display data sets are used as the displaying music content item (i.e., music content display data sets). FIG. 2 shows an example data structure of the displaying music content item (music content item, more specifically, musical score display data set) used in the embodiment of the music content display system.

As shown in FIG. 2, each music content item (i.e., music content display data set) Di generally comprises attribute information At and image data (display data substance or body) Bd, and the attribute information At includes an ID, name (music piece name) Ni, stored location (path information), number-of-page information Pt, displayability information Av, etc. of the music content display data set on question. The attribute information At can be embedded in a file name of the music content display data set Di. In this case, the file name is represented, for example, by "'ID—name of musical score—number of pages'. 'extension capable of identifying displayability information Av'", and the image data Bd is the only substantive content of the music content display data set Di. The image data Bd is the substance of the music content display data set Di for displaying on the display 6 a musical score of the music piece name Ni.

Figure 3:
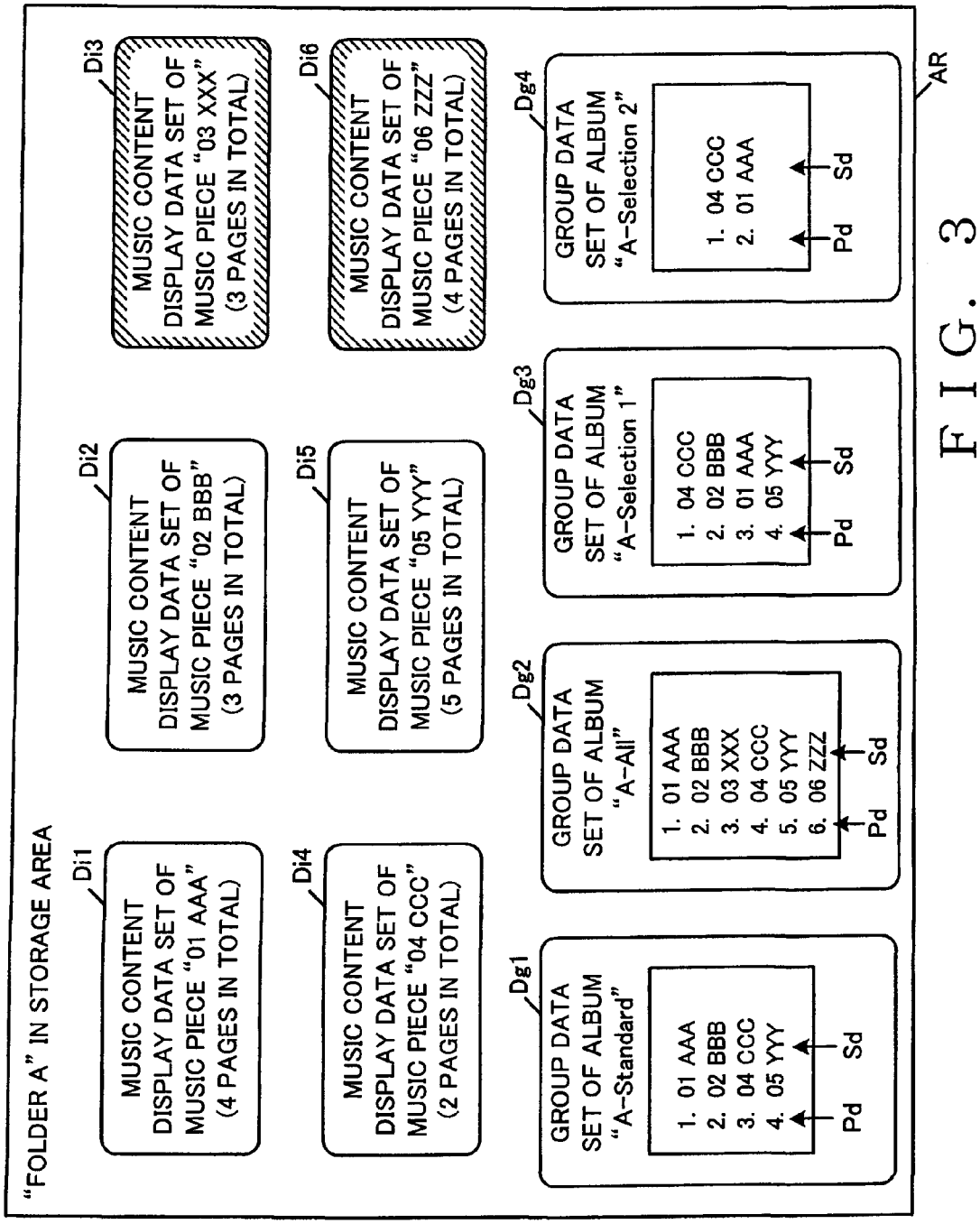
FIG. 3 is a diagram showing an example stored format of data used in the embodiment.

FIG. 3 shows an example stored format of data used in the embodiment of the music content display system. In a music piece display data storage area AR (e.g., "folder A" of the storage area) in the storage device 4 provided in the music content display apparatus ST are stored a plurality of musical score display data sets Di (Di1, Di2, . . . , Di6) (reference character "Di" represents a musical score display data set) as music content display data sets, and one or more group data sets (group display data sets) Dg (Dg1, Dg2, . . . , Dg4) (reference character "Dg" represents a group data set). Namely, the storage area of the storage device 4 storing the musical score display data sets Di functions as a storage section storing a plurality of music content items, and each of the plurality of music content items (musical score data sets) includes image data of one or more pages (page image of the musical score). Further, the area of the storage device 4 storing the group data sets Dg functions as a group data table storing one or more group data sets each defining a combination or group of two or more of the plurality of music content items stored in the storage section and display order of the two or more music content items.

Whereas, in the illustrated example, the musical score display data sets (musical score display data sets) Di and the group data set are stored in the same place (same path) AR, they may be stored in different places (different paths), e.g. separately in "folder A" and "folder B". Further, the musical score display data set (musical score display data set) Di may be stored in a built-in storage medium of the music content display apparatus ST, in a storage medium detachably attached to the music content display apparatus ST, or in another storage medium accessible via a network. The same can be said with the stored place of the group data sets Dg.

Each of the music content display data sets (musical score display data sets) Di (Di1, Di2, . . . , Di6) is a set of data indicative of a musical score of a single music piece, and, in the music content display apparatus ST, such a music content display data set can be used to display the musical score of the music piece independently as long as the data set is in a usable (displayable) state. In FIG. 3, white blocks Di1, Di2, Di4 and Di5 represent music content display data sets currently in the usable (displayable) state, while hatched blocks Di3 and Di6 represent music content display data sets currently in the non-usable (non-displayable) state. Namely, in the illustrated example of FIG. 3, the music piece display data storage area AR has currently stored therein the musical score display data sets Di1, Di2, Di4 and Di5 of music piece names "01AAA", "02BBB", "04CCC" and "05YYY" in the usable or displayable state and the musical score display data sets Di3 and Di6 of music piece names "03XXX" and "06ZZZ" in the non-usable or non-displayable state. Further, the musical score display data sets Di1, Di2, Di3, Di4, Di5 and Di6 have image data Bd of 4, 3, 3, 2, 5 and 4 pages, respectively.

The music content display sets (musical score display data set) Di3 and Di6 stored in the non-displayable state, i.e. non-displayable music content display sets Di3 and Di6, are all changed to the displayable state, for example, in response to input of "due purchase information" indicating that an electronic music apparatus (related electronic music apparatus), such as an electronic musical instrument, used with the music content display apparatus ST is a duly purchased one, e.g. upon input of an audio from the related electronic music apparatus via the audio input section 7. Alternatively, the musical score display data sets Di3 and Di6 may each be individually changed from the non-displayable state to the displayable state by the user taking an electronic procedure, such as acquisition of a license or due purchase of the musical score display data sets Di3 and Di6 themselves.

The displayability information Av, indicating whether the corresponding music content display data set Di is displayable (usable) or not, may be incorporated in the corresponding music content display data set or prestored as attribute information in association with the corresponding music content display data set. Alternatively, arrangements may be made such that whether the music content display data set Di is displayable (usable) or not can be determined by an extension of the file name. In another alternative, if the music content display data set Di is non-displayable, a predetermined letter/character string may be attached to the file name itself so that the displayable or non-displayable state can be identified from the predetermined letter/character string. In still another alternative, displayable music content display data sets and non-displayable music content display data sets may be stored in different storage locations (such as different folders or storage media) so that distinguished from each other by their respective storage so that the displayable or non-displayable state can be identified from the storage location.

In the case where all of the music content display data sets (musical score display data sets) Di stored in the music content display apparatus ST are automatically placed in the displayable state in response to the user carrying out a procedure of duly purchasing the related electronic music apparatus (electronic musical instrument) associated with the music content display apparatus ST, a dedicated flag indicating whether all of the music content display data sets Di stored in the music content display apparatus ST are currently in the displayable state or only one or some of the music content display data sets Di stored in the music content display apparatus ST are currently in the displayable state may be provided within the music content display apparatus ST, so that whether all of the stored music content display data sets Di are currently in the displayable state or only one or some of the stored music content display data sets Di are currently in the displayable state can be determined by checking a state of the dedicated flag.

Each of the group data sets DG (Dg1, Dg2, Dg3 and Dg4) (i.e., group data sets stored in the group data table) is indicative of which of the plurality of music content display data sets Di stored in the music piece display data storage area AR are to be displayed and in what order such music content display data sets Di are to be displayed. In each of the group data sets Gg, pieces of music content designation information Sd designating music content display data sets Di registered in the group data sets Gg are recorded in an order corresponding to a predetermined order where the music content display data sets Di are to be displayed (i.e., order of scheduled display or display order). In the illustrated example of FIG. 3, order information Pd indicative of the order of scheduled display (display order) is represented by numbers 1, 2, . . . , and the pieces of music content designation information Sd are represented by the names Ni of the music content display data sets Di in an image-like manner. Note that any new music content display data set Di can be added to the group data set Dg and any of the registered music content display data sets Di can be deleted from the group data set Dg. The group data sets Dg1, Dg2, Dg3 and Dg4 of albums named "A-Standard", "A-All", "A-Selection 1" and "A-Selection 2" are currently stored in the music piece display data storage area AR in the illustrated example of FIG. 3.

For example, the music content display data sets Di1, Di2, Di4 and Di5 of music piece names "01AAA", "02BBB", "04CCC" and "05YYY" designated by the music content designation information Sd are registered in the group data set Dg1 of album "A-Standard" (i.e, first group data set Dg1) in the order Pd illustrated in FIG. 3. Let it be assumed that each of sets of three same letters, "AAA", "BBB", "CCC", "XXX", "YYY" and "ZZZ", represents the music piece name. The music content display data sets Di 1 to Di6 of music piece names "01AAA", "02BBB", "03XXX", "04CCC", "05YYY" and "06ZZZ" designated by the music content designation information Sd are registered in the group data set Dg2 of album "A-All" (i.e., second group data set Dg2) in the order Pd illustrated in FIG. 3, of which the music content display data sets Di3 and Di6 of music piece names "03XXX" and "06ZZZ," are in the non-displayable state as will be later detailed. Namely, a non-displayable music content display data set may sometimes be designated in the group data set Dg.

The music content display data sets Di4, Di2, Di1 and Di5 of music piece names "04CCC", "02BBB", "01AAA" and "05YYY" designated by the music content designation information Sd are registered in the group data set Dg3 of album "A-Selection 1" (i.e., third group data set Dg3) in the order Pd illustrated in FIG. 3. The music content display data sets included in album "A-Selection 1" are of the same types Sd as the music content display data sets included in album "A-Standard", but is different in the display order Pd from the music content display data sets included in album "A-Standard". Note that the display order Pd can be changed in accordance with user's editing, increasing order of displayable pages, or the like. Further, the music content display data sets Di4 and Di1 of music piece names "04CCC" and "01AAA" are registered in the group data set Dg4 of album "A-Selection 2" (i.e., fourth group data set Dg4) in the order Pd illustrated in FIG. 3.

[Display Image]

Figure 5:
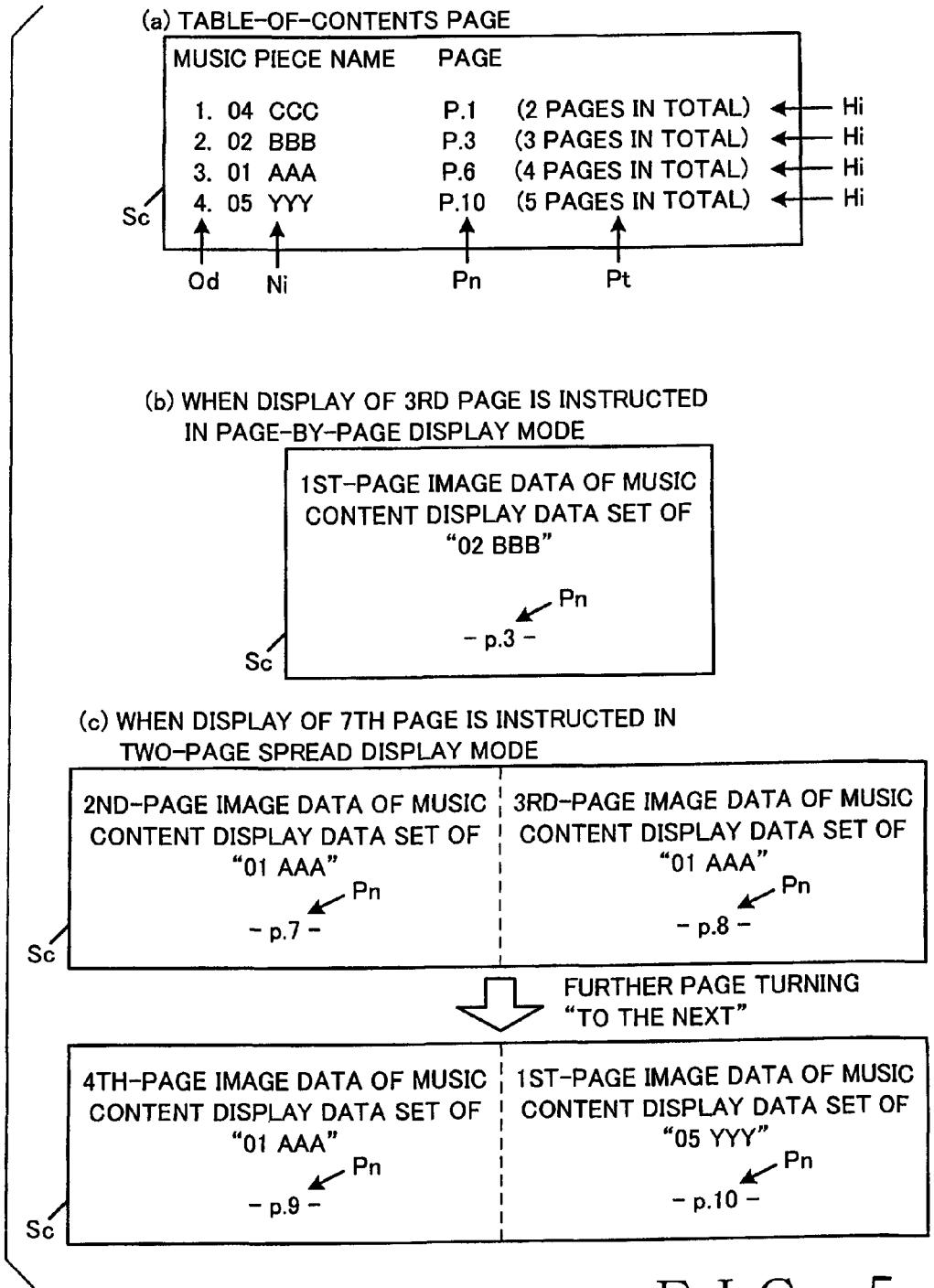
FIG. 5 is a diagram showing other examples of the display images displayed in the embodiment.

FIGS. 4 and 5 show example display images presented in the instant embodiment of the present invention, of which FIG. 4 shows display images presented in response to selection of the group data set Dg2 of album "A-All" or when setting (A) that "all of displayable music content display data sets stored in the music piece display data storage area AR should be displayed in an increasing order of the serial numbers" is selected. In this case, a table-of-contents image where the music piece names Ni of the music content display data sets Di are arranged row by row in accordance with the order Pd or serial numbers on the basis of the group data set Dg of album "A-All" or setting (A) is displayed on a table-of-contents page displayed on a screen Sc of the display 6.

Here, for each of the rows of music piece names "01AAA", "02BBB", "04CCC" and "05YYY", a position number in the display order Od, serial page number Pn of the first page and total number of pages Pt are additionally displayed in a highlighted style Hi in (a) of FIG. 4 together with the music piece name Ni, and such a row in the highlighted style Hi is selectable through a user's operation, such as a touch operation, and the music content display data set Di corresponding to the user-selected row can be displayed. For each of the rows of music piece names "03XXX" and "06ZZZ", on the other hand, only the music piece name Ni is displayed in a dark style Dk, and such a row displayed in the dark style Dk is not selectable by the user, and thus, the music content display data sets Di3 and Di6 cannot be displayed. Namely, pieces of information related to the music content display data sets Di in the displayable state are displayed in the displayability-indicating display style Hi using solid lines, black color, etc., while pieces of information related to the music content display data sets Di in the non-displayable state are displayed in the non-displayability-indicating display style Dk, using broken lines, light gray color, etc. Note that the music piece name Ni (row) of each of the music content display data sets Di in the non-displayable state need not be displayed on the table-of-contents page screen Sc.

Once display of a predetermined page, e.g. third page, is instructed by a user's operation while a "page-by-page display mode" is set and the table-of-contents page as shown in (a) of FIG. 4 is displayed, a content page as shown in (b) of FIG. 4 is displayed on the screen Sc of the display 6. Namely, third-page image data Bd of the music content display data set Di1 of music piece "01AAA" corresponding to the serial page number Pn=3 is read out from the music piece display data storage area AR and displayed on the screen Sc, but also page number "p.3" is displayed in a lower portion of the screen Sc.

Once display of a predetermined page is instructed by a user's operation while a "two-page spread display mode" is set, a content display as shown in an upper portion in (c) of FIG. 4 is displayed on the screen Sc. For example, once display of a seventh page is instructed, third-page image data Bd of the music content display data set Di2 of music piece "02BBB" corresponding to the serial page number Pn=7 and page number "p.7" are displayed in a left-side portion of the screen Sc, while first-page image data Bd of the music content display data set Di4 of music piece "04CCC" corresponding to the serial page number Pn=8 and page number "p.8" are displayed in a right-side portion of the screen Sc.

Further, once a user's operation for turning a musical score to the next page (musical score page turning operation) is performed, second-page image data Bd of the music content display data set Di4 of music piece "04CCC" corresponding to the serial page number Pn=9 incremented by 1 from the last page number Pn=8 of the so-far displayed content page shown in the upper portion of (c) of FIG. 4 and page number "p.9" are displayed in the left-side portion of the screen Sc, while first-page image data Bd of the music content display data set Di5 of music piece "05YYY" corresponding to the serial page number Pn=10 incremented by 2 from the last page number Pn=8 of the so-far displayed content page and page number "p.10" are displayed in the right-side portion of the screen Sc.

FIG. 5 shows display images presented in response to selection of a group data set of album "A-Selection 1" or in accordance with a setting (B) that "all of displayable music content display data sets should be displayed in an increasing order of the numbers of pages". In this case, a table-of-contents image where the music piece names Ni of the music content display data sets Di are ordered in accordance with the increasing order of the total numbers of pages Pt on the basis of the settings of the group data set Dg3 of album "album "A-Selection 1" or above-mentioned setting (B) and arranged row by row as shown in (a) of FIG. 5 (on condition that the music piece names Ni of music content display data sets Di in the non-displayable state are not displayed).

Here, for each of the rows of music piece names "04CCC", "02BBB", "01AAA" and "05YYY", which correspond to displayable music content display data sets Di, a position number in the display order Od, serial page number Pn of the first page and total number of pages Pt are additionally displayed in a highlighted style Hi (using solid lines and black color), and such a row in the highlighted style Hi is selectable through a user's operation, such as a touch operation, and the music content display data set Di corresponding to the user-selected row can be displayed.

Once display of a predetermined page, e.g. third page, is instructed by a user's operation while a "page-by-page display mode" is set and the table-of-contents page as shown in (a) of FIG. 5 is displayed, a content page as shown in (b) of FIG. 5 is displayed. Namely, "first-page image data Bd of the music content display data set Di2 of music piece "02BBB" corresponding to the serial page number Pn=3 is read out from the music piece display data storage area AR and displayed on the screen Sc together with page number "p.3" displayed in a lower portion of the screen, as shown in (b) of FIG. 5.

Further, once display of a predetermined page is instructed by a user's operation while a "two-page spread display mode" is set, a content display as shown in an upper portion in (c) of FIG. 5 is displayed on the screen Sc. For example, once display of a seventh page is instructed, "second-page image data Bd of the music content display data Di1 of music piece "01AAA" corresponding to the serial page number Pn=7 and page number "p.7" are displayed in the left-side portion of the screen Sc, while "third-page image data Bd of the music content display data Di1 of music piece "01AAA" corresponding to the serial page number Pn=8 and page number "p.8" are displayed in the right-side portion of the screen Sc.

Further, once a user's operation for turning a musical score to the next page is performed, "fourth-page image data Bd of the music content display data set Di1 of music piece "01AAA" corresponding to the serial page number Pn=9 incremented by 1 from the last page number Pn=8 of the so-far displayed content page shown in the upper portion of (c) of FIG. 5 and page number "p.9" are displayed in the left-side portion of the screen Sc, while "first-page image data Bd of the music content display data set Di5 of music piece "05YYY" corresponding to the serial page number Pn=10 incremented by 2 from the last page number Pn=8 of the so-far displayed content page and page number "p.10" are displayed in the right-side portion of the screen Sc.

In the instant embodiment of the music content display system of the present invention, as set forth above, music content display data sets (musical score display data sets) Di (Di1, Di2, . . . ) related to a plurality of music pieces are stored in the music piece display data storage area AR, and each of the music content display data sets Di includes image data Bd of one or more pages (Pt). An order Od in which a plurality of desired music content display data sets Di are to be displayed is determined, and a page arrangement where the image date Bd of the plurality of music content display data sets Di are arranged consecutively in accordance with the determined order Od is specified. Once page number information Pn indicative of a page to be displayed is acquired, the page, in the page arrangement, specified by the acquired page number information Pn is identified, and the image data Bd of the identified page is searched for and retrieved from the music piece display data storage area AR, so that the retrieved image data Bd is displayed on the screen Sc. Namely, at the time of the display of the image data Bd, adjustment is made such that the page numbers Pn become consecutive among a plurality of the music content display data sets Di. Further, the latest displayable or non-displayable state of each of the stored music content display data sets Di, so that a plurality of the displayable music content display data sets Di (e.g., Di1, Dig, Di4 and Di5) are displayed in a consecutive fashion. Further, a combination and order of the music content display data sets to be displayed consecutively are determined automatically or by editing (including compilation or separation) based on a user's operation. In the case where a combination and order of the music content display data sets to be displayed consecutively are determined automatically, one or more group data sets Dg (Dg1, Dg2, . . . ), for which the content designation information Sd and order information Pd define which and in which order music content display data sets are to be displayed can be stored in the music piece display data storage area AR, and music content display data sets Di to be displayed and display order of the music content display data sets Di can be designated by any one of the group data sets Dg.

[Example Behavior]

FIGS. 6 to 16 are flow charts of the music content display processing performed in the instant embodiment of the invention, of which FIG. 6 is a flow chart generally showing an example overall operational sequence of the music content display processing. The music content display processing is started up in response to powering-on of the music content display apparatus or in response to a music content display program start-up instruction, upon which the CPU 1 performs initial setting for the following items at first step P1.

(1) Setting of a display mode: Although the "page-by-page display mode" and the "two-page spread display mode" have been described as settable display modes in the instant embodiment, a display mode for displaying three or more pages at a time may also be set in the instant embodiment.

(2) Setting of a page to be displayed first: The CPU 1 can set a table-of-contents page, first page, last page or predetermined page as the "page to be displayed first".

(3) Setting of a table of contents: The CPU 1 can set whether there should be displayed a table of contents (i.e., the table-of-contents setting is "to be made") or there should not be displayed a table of contents (i.e., the table-of-contents setting is "to be not made") can be set as desired by the user. In the case where there should be provided a table of contents, the CPU 1 can further set whether "the name of a non-displayable music content display data set should also be displayed".

(4) Setting of an image reference rule: For the image reference rule, the CPU 1 can set whether "image data of a music content display data set should be referenced directly", "image data extracted from a music content display data set should be referenced" or "image data created for all pages in display order should be referenced in a display order".

(5) Designation of a referencing path (storage place or area of group data sets that are objects of display and music content display data sets that are objects of reference); a plurality of such referencing paths may be designated.

(6) Other setting: Initialization of a screen size, background color and variables, etc.

At step P2, the CPU 1 checks states of music content display data sets and group data sets and revise the music content display data sets and the group data sets as necessary. Namely, the CPU 1 ascertains:

(1) whether any music content display data set is currently stored in a path (storage area) set as the "referencing path", (2) whether any group data set is currently stored in a path (storage area) set as the "referencing path", or (3) per group data set, whether each music content display data set designated as being in the displayable state is currently stored in the displayable state. Then, the CPU 1 revises the group data set depending on the result of the ascertainment in item (3) above. If no music content display data set has been found as a result of the ascertainment in item (1) above, the CPU 1 changes the setting of the "referencing path" (through a user's operation or automatic search). Let it be assumed here that no increase/decrease (addition/deletion) and no change of the displayable or non-displayable state are made of currently-displayed music content display data sets.

An example revision of a group data set is as follows. If a music content display data set to be displayed in a third position in a given group data set Dg has not be found in a designated path due to deletion or transfer by the user, then the third information in the group data set Dg is deleted, and fourth and subsequent information is moved upward in the group data set Dg. Further, if the music content display data set to be displayed in the third position has changed to the non-displayable state although not deleted, relevant information is deleted from the group data set Dg if the table-of-contents setting is "to be not made" or "to be made without the name of each non-displayable music content display data set being displayed".

At next step P3, a display order determination process (FIGS. 7 and 8) is performed to change "current display order" in response to a user's operation. Note that, at this step, a plurality of displayable music content display data sets are made referenceable. Following the display order determination process of step P3, the CPU 1 proceeds to step P4, where a determination is made by the CPU 1 as to whether or not the current image reference rule is "image data created for all pages should be referenced", i.e. whether or not the image reference rule that "image data created for all pages in a display order should be referenced in a display order" ("all pages created") has been set at step P1 above. If the image reference rule that "image data created for all pages should be referenced in a display order" has been set at step P1 as determined at step P4 (YES determination at step P4), the CPU 1 performs an all-page image creation process at step P5 (FIGS. 9 and 10) for creating image data of all pages.

If the current image reference rule is not "image data created for all pages should be referenced in a display order" as determined at step P4 (NO determination at step P4), or following the all-page image creation process of step P5, the CPU 1 moves to step P6 to display image data of a page to be displayed first (see FIGS. 15 and 16) on the display 6 in accordance with the "setting of a page to be displayed first" initially set at step P1, and then moves further to step P7. At step P7, a determination is made by the CPU 1 as to whether or not a display termination instruction based on a user's operation on the input operation section 5 has been received. If such a display termination instruction has not been received (NO determination at step P7), the CPU 1 moves further to step P8, where a further determination is made as to whether or not a user's request for changing the display order has been received. If such a user's request for changing the display order has been received (YES determination at step P8), the CPU 1 reverts to step P2 to repeat the operations of steps P2 to P8.

If, on the other hand, such a user's request for changing the display order has not been received (NO determination at step P8), the CPU 1 moves further to step P9, where a further determination is made as to whether or not a user's musical score page turning instruction has been received. With a NO determination at step P9, the CPU 1 immediately reverts to step P7, while, with a YES determination at step P9, the CPU 1 performs a musical score page turning process (see FIGS. 13 and 14) at step P10 and then reverts to step P7. Then, if a display termination instruction has been received as determined at step P7 (YES determination at step P7), the CPU 1 terminates the music content display processing.

[Display Order Determination Process]

Figure 7:
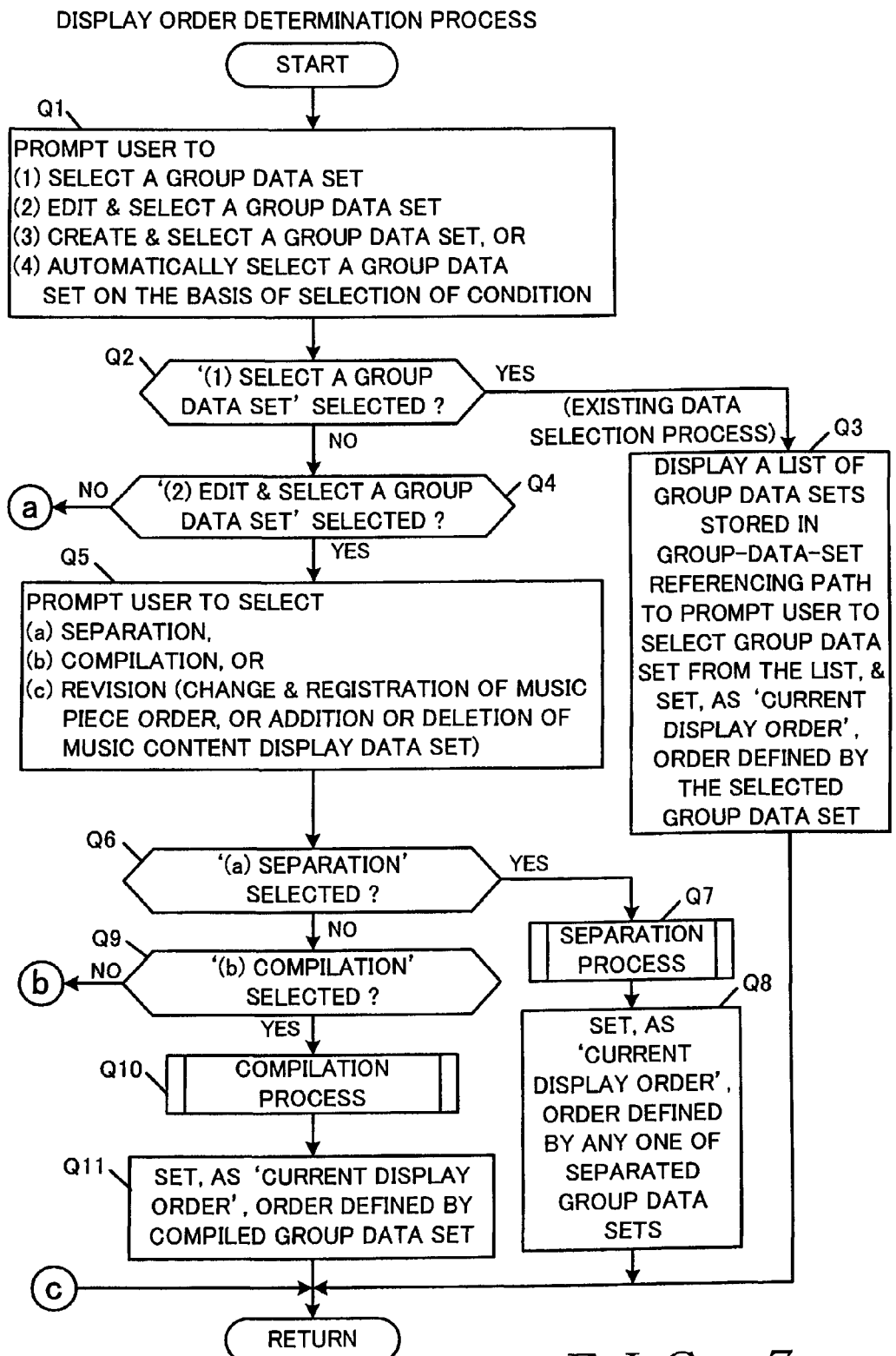
FIG. 7 is a flow chart showing a part of an example operational sequence of a display order determination process performed in the embodiment.
Figure 8:
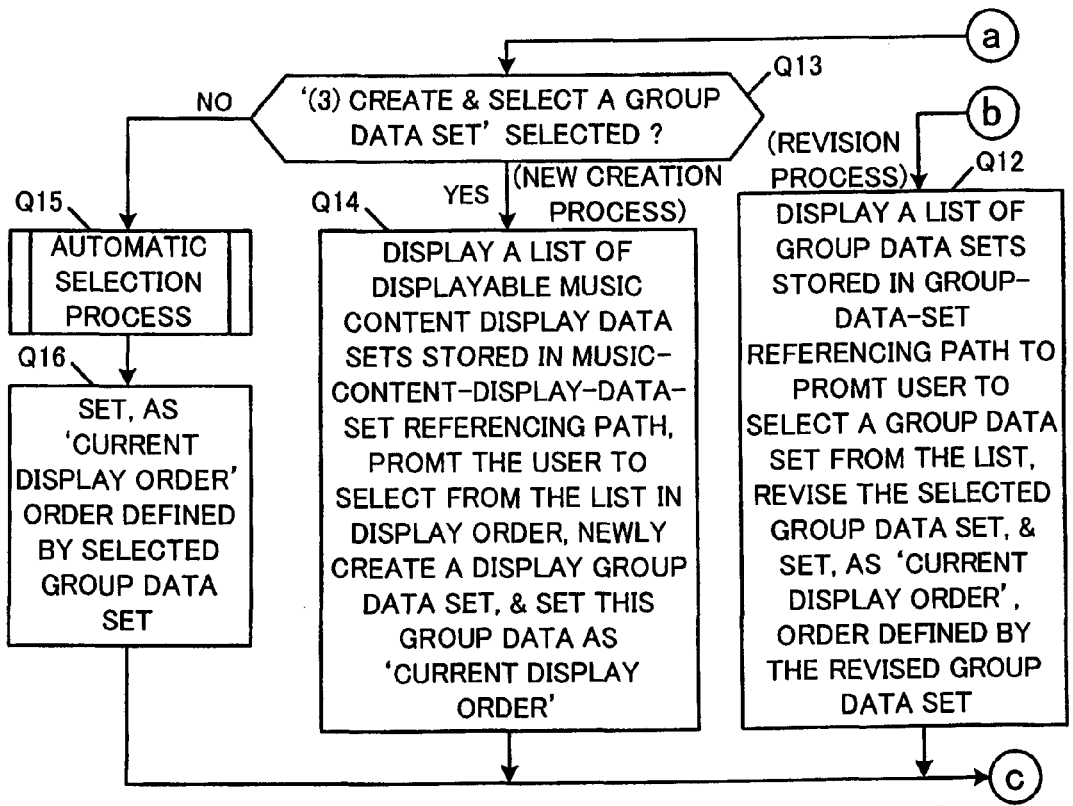
FIG. 8 is a flow chart showing the remaining part of the example operational sequence of the display order determination process.

FIGS. 7 and 8 are a flow chart showing an example operational sequence of the display order determination process performed at step P3 of the music content display processing of FIG. 6. The aforementioned arrangements for causing the CPU 1 to execute the program (group of instructions) related to the display order determination process correspond to or constitute an "order determination section" adapted to determine a display order of two or more of the plurality of music content items stored in the storage section (storage device 4). At step Q1, the CPU 1 presents the following four, (1) to (4), options on the display 6 to prompt the user to select any one of the four options:

(1) selecting a group data set;
(2) editing a group data set and selecting the thus-edited group data set;
(3) creating a group data set and selecting the thus-created group data set; and
(4) automatically selecting a group data set on the basis of selection of a condition.

Note that, in a case where no group data set Dg is currently stored in the music content display apparatus ST or in a case where no group data Dg having one or more displayable music content display data sets registered therein is stored in the music content display apparatus ST, the user cannot select options (1) and (2) above.

At next step Q2, a determination is made as to whether or not the above-mentioned (1) option of "selecting a group data set" has been selected. If the (1) option of "selecting a group data set" has been selected by the user (YES determination at step Q2), the CPU 1 proceeds to step Q3 to perform an "existing data selection process", where a list of group data sets Dg stored in the group-data-set referencing path is displayed so that the user is prompted to select a desired one of the group data sets Dg (note that only a group data set Dg in the displayable state (i.e., displayable group data set Dg) is selectable at that time). Then, the order of music content display data sets Di defined by the thus-selected group data set Dg is set as the "current display order", after which the CPU 1 terminates the instant display order determination process and then reverts to step P4 of the music content display processing of FIG. 6. The aforementioned arrangements for causing the CPU 1 to execute the program (group of instructions) related to steps Q2 and Q3 correspond to or constitute the above-mentioned "order determination section" determining, in accordance with a combination and display order of two or more music content items defined by one group data set selected from the "group table", an order of the two or more music content items.

If, on the other hand, the (1) option has not been selected (NO determination at step Q2), the CPU 1 proceeds to step Q4, where a further determination is made as to whether or not the (2) option of "editing a group data set and selecting the thus-edited group data set" has been selected. If the (2) option has been selected by the user (YES determination at step Q4), the CPU 1 performs a "group editing process", where it edits and selects a group data set and sets of the order of music content display data sets Di defined by the selected group data sets as the "current display order" by sequentially executing steps Q5 to Q12. More specifically, at step Q5 of the group editing process, the CPU 1 presents options, i.e. (a) "separation", (b) "compilation" and (c) revision (change and registration of an order of music pieces, or addition or deletion of a music content display data set) so that the user is prompted to select any one of the (a), (b) and (c) options. Note that, if only one group data set Dg is stored, the user cannot select the (b) option. Also note that the term "separation" is used herein to refer to separating one group data set (source group data set) into a plurality of destination group data sets while the term "compilation" is used herein to refer to combining or putting together a plurality of group data sets (source data sets) into a single destination data set.

At step Q6, a determination is made whether or not the (a) option of "separation" has been selected by the user. If the (a) option of "separation" has been selected by the user (YES determination at step (6), the CPU 1 proceeds to step Q7 to perform a "separation process" in accordance with the following sequence of operations (1) to (6).

(1) A separation operation is started after a group data set Dgh that should become a separation source (i.e., separation-source group data set Dgh) and the number of group data set Dgh to be newly created (default number is "one") (separation-destination group data set Dgh) are designated. For example, a separation operation screen is displayed, and the user is prompted to manipulate the separation operation screen for that purpose.

(2) From a display of registered content (i.e., a list of registered music content display data sets Di) of the separation-source group data set Dga, music content display data sets Di to be transferred to a separation destination Dg are sequentially selected until a separation-destination group data set Dgh is completed.

(3) The thus-completed separation-destination group data set Dgh is assigned a name and then stored into the music piece display data storage area AR.

(4) The user is caused to make a selection as to whether the separation-source group data set Dgb, where some of the registered music content display data sets have been transferred to the separation-destination group data set Dgh and thus the number of the music content display data sets registered therein has decreased, should be stored by being written over the previous separation-source group data set Dga (i.e., separation-source group data set Dga used before the current registered music content display data set transfer) (overwriting storage of the separation-source group data set Dgb) or should be stored separately after being assigned a name different from that of the previous separation-source group data set Dga. Alternatively, the separation-source group data set Dgb should be stored by being written over the previous separation-source group data set Dgh or should be stoned separately may be predetermined by default.

(5) If the overwriting storage of the separation-source group data set Dgb has been selected by the user in the (4)

operation above, the separation-source group data set Dga is updated with the new separation-source group data set Dgb (i.e., separation-source group data set having been subjected to the current registered music content display data set transfer). If, on the other hand, the separate storage of the separation-source group data set Dgb has been selected, the separation-source group data set Dgb, where some of the registered music content display data sets have been transferred to the separation-destination group data set Dgh and thus the number of the registered music content display data sets has decreased, is created as a new separation-source group data set Dgb, assigned a name and then stored. In this case, the registered content of the group data set Dga designated as the separation source does not change, and the separation-source group data set Dgb, having registered therein a difference in music content display data set Di between the separation-destination group data set Dgh and the separation-source group data set Dga, is created as the new separation-source group data set Dgb.

(6) The separation process, i.e. display of the separation operation screen, is terminated.

At next step Q8, the order of music content display data sets Di defined by any one of the separated group data sets Dg (i.e., user-selected one or predetermined one of the previous group data set Dga, new separation-source group data set Dgb and separation-destination group data set Dgh) is set as the "current display order". Then, the CPU 1 terminates the instant display order determination process and then reverts to step P4 of the music content display processing of FIG. 6.

If the (a) option of "separation" has not been selected by the user as determined at step Q6 (NO determination at step Q6), the CPU 1 proceeds to step Q9, where a further determination is made as to whether or not the (b) option of "compilation" has been selected. If the (b) option of "compilation" has been selected by the user (YES determination at step Q9), the CPU 1 proceeds to step Q10 to perform a "compilation process". The "compilation process" is performed in accordance with the following sequence of operations (1) to (7).

(1) A plurality of (e.g., two) group data sets Dgc and Dgd that should become compilation sources (i.e., compilation-source group data sets) are designated.

(2) Selection is made of an arrangement (music piece order) rule of music content display data sets Di in a compilation-destination group data set Dgi. Examples of such an arrangement rule are set forth in items (2-1) to (2-5) below.

(2-1) Music content display data sets Di registered in the group data sets Dgc and Dgd are registered into the compilation-destination group data set Dgi in a designated order. For example, music content display data sets Di registered in the group data set Dgc are sequentially registered into the compilation-destination group data set Dgi from the first music content display data set onward, and then music content display data sets Di registered in the other group data set Dgd, which have not yet been registered in the compilation-destination group data set Dgi, are sequentially registered into the compilation-destination group data set Dgi.

(2-2) All of the music content display data sets Di registered in the compilation-source group data sets Dgc and Dgd are sequentially registered into the compilation-destination group data set Dgi in the order of their IDs. In this case, if any two of the music content display data sets Di registered in the group data sets Dgc and Dgd have a same ID, only one of the two music content display data sets Di having the same ID is registered into the compilation-destination group data set Dgi with the other of the two music content display data sets Di erased (i.e., exclusion of a duplication).

(2-3) All of the music content display data sets Di registered in the group data sets Dgc and Dgd are sequentially registered into the compilation-destination group data set Dgi in the order of their names. In this case, if any two of the music content display data sets Di registered in the group data sets Dgc and Dgd have a same name, only one of the two music content display data sets Di having the same name is registered into the compilation-destination group data set Dgi with the other of the two music content display data sets Di erased (i.e., exclusion of a duplication).

(2-4) All of the music content display data sets Di registered in the group data sets Dgc and Dgd are sequentially registered into the compilation-destination group data set Dgi in the order of the numbers of pages of the music content display data sets Di registered in the group data sets.

(2-5) All of the music content display data sets Di registered in the group data sets Dgc and Dgd are sequentially registered into the compilation-destination group data set Dgi in the chronological order or reverse chronological order of the creation dates of the music content display data sets Di registered in the group data sets.

(3) The music content display data sets Di registered in the plurality of compilation-source group data sets Dgc and Dgd designated in the (1) operation above are registered into the compilation-destination group data set Dgi in the order based on the rule selected in the (2) operation above.

(4) The compilation-destination group data set Dgi is assigned a name and then stored with the assigned name.

At following step Q11, the order defined by the compilation-destination (or complied) group data set Dgi having the music content display data sets Di compiled therein is set as the "current display order". Then, the CPU 1 terminates the instant display order determination process and then reverts to step P4 of the music content display processing of FIG. 6.

If, on the other hand, the (b) option has not been selected, i.e. the (c) option has been selected, (NO determination at step Q9), the CPU 1 proceeds to step Q12 of FIG. 8, where a "revision process" is performed so that the order of music content display data sets Di defined by the group data set Dgj revised by the revision process is set as the "current display order". Namely, in the "revision process", a list of group data sets Dg stored in the group-data-set referencing path is displayed on the screen of the display 6 so that the user is prompted to select, from the displayed list, a group data set Dge to be revised. Then, revisions, such as a revision of the music piece order or addition/deletion of a music content display data set Di, are made to the user-selected group data set Dge on the basis of user's operations, so that the thus-revised group data set Dge is stored. Note that, at the time of the storage of the revised group data set Dge, a new name may be assigned to the revised group data set Dge. After that, the CPU 1 sets the order of music content display data sets Di defined by the revised group data set Dge as the "current display order", then terminates the instant display order determination process and then reverts to step P4 of the music content display processing of FIG. 6.

Further, if the (2) option of "editing a group data set and selecting the thus-edited group data set" has not been selected by the user as determined at step Q4 of FIG. 7 (NO determination at step Q4), the CPU 1 proceeds to step Q13 of FIG. 8, where a further determination is made as to whether or not the (3) option of "creating a group data set and selecting the thus-created group data set" has been selected. If the (3) option has been selected (YES determination at step Q13), the CPU 1 goes to step Q14 to perform a "new creation process", and it sets, as the "current display order", the order of music content display data sets Di defined by a group data set Dgk having been newly created in the "new creation process". Namely, in the "new creation process", a list of displayable music content display data sets Di stored in the music-content-display-data-set referencing path is displayed on the screen of the display 6 to prompt the user to select, from the displayed list, desired ones of the music content display data sets in a desired display order, so that the CPU 1 newly creates a group data set Dgk based on the user-selected music content display data sets and stores the newly-created group data set Dgk after assigning a name thereto. After that, the CPU 1 sets, as the "current display order", the order of music content display data sets Di defined by the group data set Dgk, then terminates the instant display order determination process and then reverts to step P4 of the music content display processing of FIG. 6. The aforementioned arrangements for causing the CPU 1 to execute the program (group of instructions) related to step Q14 correspond to the above-mentioned "order determination section" creating, in response to a user's operation, a group data set defining a combination and display order of two or more of the plurality of music content items stored in the storage section and then determining an order of the two or more music content items in accordance with the combination and display order of the two or more music content items defined by the created group data set.

Further, the aforementioned arrangements for causing the CPU 1 to execute the program (group of instructions) related to steps Q4 to Q12 of FIGS. 7 and 8 correspond to or constitute an "editing section" adapted to select, in response to a user's operation, at least one desired group data set from among the group data sets stored in the group data table and edit, in response to a user's operation, at least one of the combination and display order of the music content items defined by the selected desired group data set.

Furthermore, the aforementioned arrangements for causing the CPU 1 to execute the program (group of instructions) related to steps Q4 to Q11 of FIG. 7 correspond to the "editing section" performing editing which is at least one of: dividing a plurality of music content items, defined by one selected group data set, into two or more new groups; compiling a plurality of music content items, defined by two or more selected group data sets, into one new group; deleting any of a plurality of music content items defined by one selected group data set; adding another music content item to a combination of music content items defined by one selected group data set; and changing a display order defined by one selected group data set.

Further, if the (3) option has not been selected by the user as determined at step Q13 (NO determination at step Q13), the CPU 1 proceeds to step Q15 of FIG. 8, where an "automatic selection process" is performed in accordance with the following sequence of operations (1) to (3).

(1) Selection is made of any one of "automatic group data selection rules" set forth in items (a) to (d) below. Such selection may be made by a user's operation or determined in advance by default.

(a) Select a group data set having a great number of displayable music content display data sets Di registered therein.

(b) Select a group data set having a small number of displayable music content display data sets Di registered therein.

(c) Select a group data set where the ID of a displayable music content display data set registered at the beginning of the group data set is the smallest among all of the group data sets Dg stored in the path.

(d) Select a group data set where the first letter of the name of a displayable music content display data set registered at the beginning of the group data set is, for example, the frontmost in the alphabetical order among all of the group data sets Dg stored in the path.

(2) in the case where group data sets Dg are stored in the group-data-set referencing path, select one of the stored group data sets Dg in accordance with any one of the automatic group data selection rules set forth in items (a) to (d) above.

(3) in the case where no group data set Dg is stored in music-content-display-data referencing path, or where no group data set Dg having one or more displayable music content display data sets registered therein is stored in the music-content-display-data referencing path, a group data set Dg where displayable music content data sets Di stored in the music-content-display-data-set referencing path are registered, for example, in the order of their IDs or names is newly created and stored with a name assigned thereto. Then, the thus-name-assigned, hew group data set Dg is selected.

At following step Q16, the order of music content display data sets Di defined by the thus-selected group data set Dg is set as the "current display order". Then, the CPU 1 terminates the instant display order determination process and then reverts to step P4 of the music content display processing of FIG. 6.

[All-page Image Creation Process]

Figure 9:
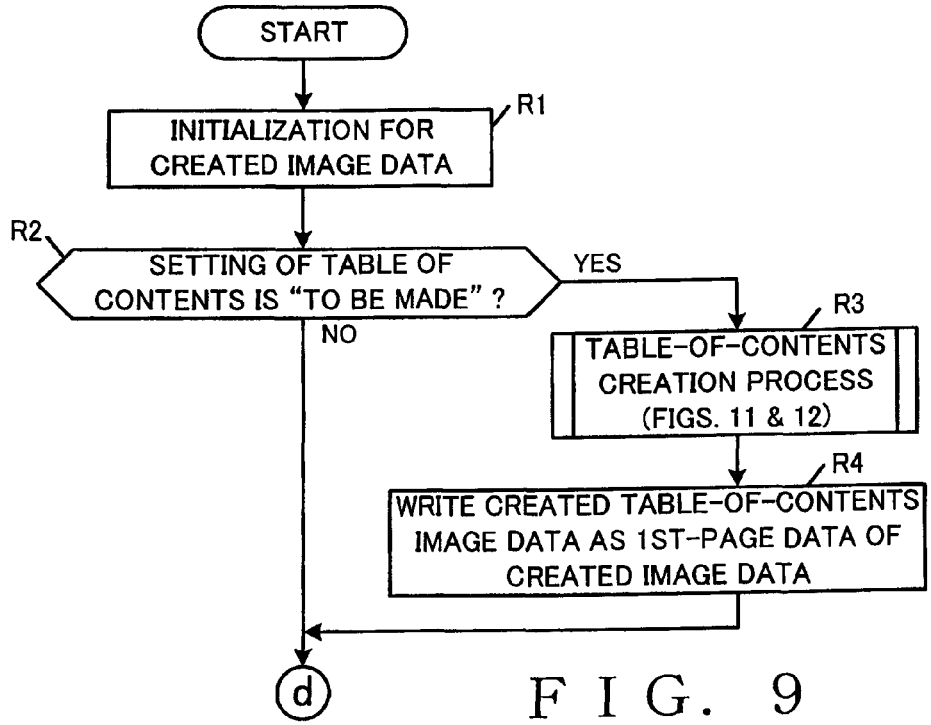
FIG. 9 is a flow chart showing a part of an example operational sequence of an all-page image creation process performed in the embodiment.
Figure 10:
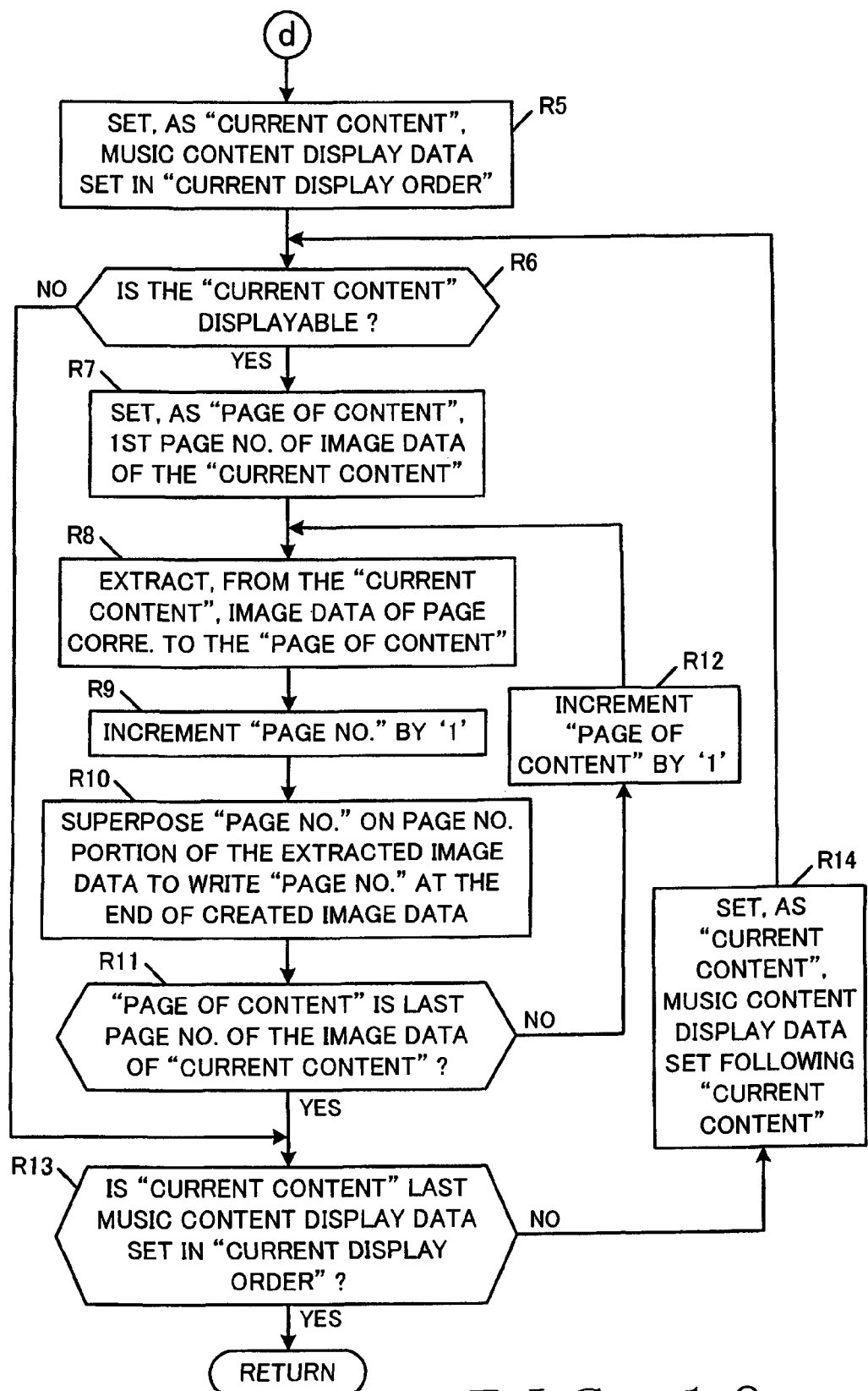
FIG. 10 is a flow chart showing the remaining part of the example operational sequence of the all-page image creation process.

FIGS. 9 and 10 are a flow chart showing an example operational sequence of an all-page image creation process performed at step P5 of the music content display processing of FIG. 6, where a legend in each double quotation mark ("") represents a variable. At first step R1, the CPU 1 performs initialization for created image data. In the initialization, the CPU 1, for example, secures, within the RAM 2, storage areas, such as a "created image storage area" for image data creation and an "all-page image storage area" for storing created image data of all pages (i.e., "all-page image data"), initializes the "page number" to "0" and makes other settings. Then, at step R2, the CPU 1 determines whether or not the setting of a table of contents is "to be made". If the setting of a table of contents is to be "made" (YES determination at step R2), the CPU 1 proceeds to step R3 to perform a table-of-contents image creation process (see FIGS. 11 and 12), after which the CPU 1 goes to next step R4 to write table-of-contents image data, created by the table-of-contents image creation process, as first-page data of created image data.

If, on the other hand, the setting of a table of contents is "to be not made" (NO determination at step R2), or after completion of the operation of step R4, the CPU 1 proceeds to step R5 of FIG. 10, where the first music content display data set in the "current display order" is set as the "current content". Then, at step R6, a determination is made as to whether or not the "current content" is in the displayable state. If the "current content" is in the displayable state (YES determination at step R6), the CPU 1 proceeds to step R7, where the first page number of image data of the "current content" is set as "page of content". Then, the CPU 1 extracts, from the "current content", image data of the page corresponding to the "page of content" at step R8 and increments the "page number" by "1" to update the "page number" by "1" at next step R9. Then, at step R10, the CPU 1 writes the updated "page number" over the page number portion of the extracted image data to thereby change the page number display of the extracted image data to the updated "page number", then performs a write operation for adding the extracted image data, having the page number changed in the aforementioned manner, to the end of the created image data, and then proceeds to step R11.

At step R11, a determination is made as to whether or not the "page of content" is the last page number of the image data of the "current content". If the "page of content" is not the last page number of the image data of the "current content" (NO determination at step R11), the CPU 1 increments the "page of content" by "1" at step R12 and then reverts to step R8 to repeat the operations of steps R8 to R12.

If the "current content" is not in the displayable state (NO determination at step R6), or if the "page of content" is the last page number of the image data of the "current content" (YES determination at step R11), the CPU 1 proceeds to step R13, where a determination is made as to whether or not the "current content" is the last music content display data set in the "current display order". If the "current content" is not the last music content display data set in the "current display order" (NO determination at step R13), the CPU 1 branches to step R14, where a music content display data set immediately following the "current content" in the "current display order" is set as the "current content". After that, the CPU 1 reverts to step R6 to repeat the operations of steps R6 to R14.

If, on the other hand, the "current content" is the last music content display data set in the "current display order" (YES determination at step R13), the CPU 1 outputs created all-page image data to the all-page image storage area of the RAM 2 and then reverts to step P6 of the music content display processing of FIG. 6.

<Table-of-contents Image Creation Process>

Figure 11:
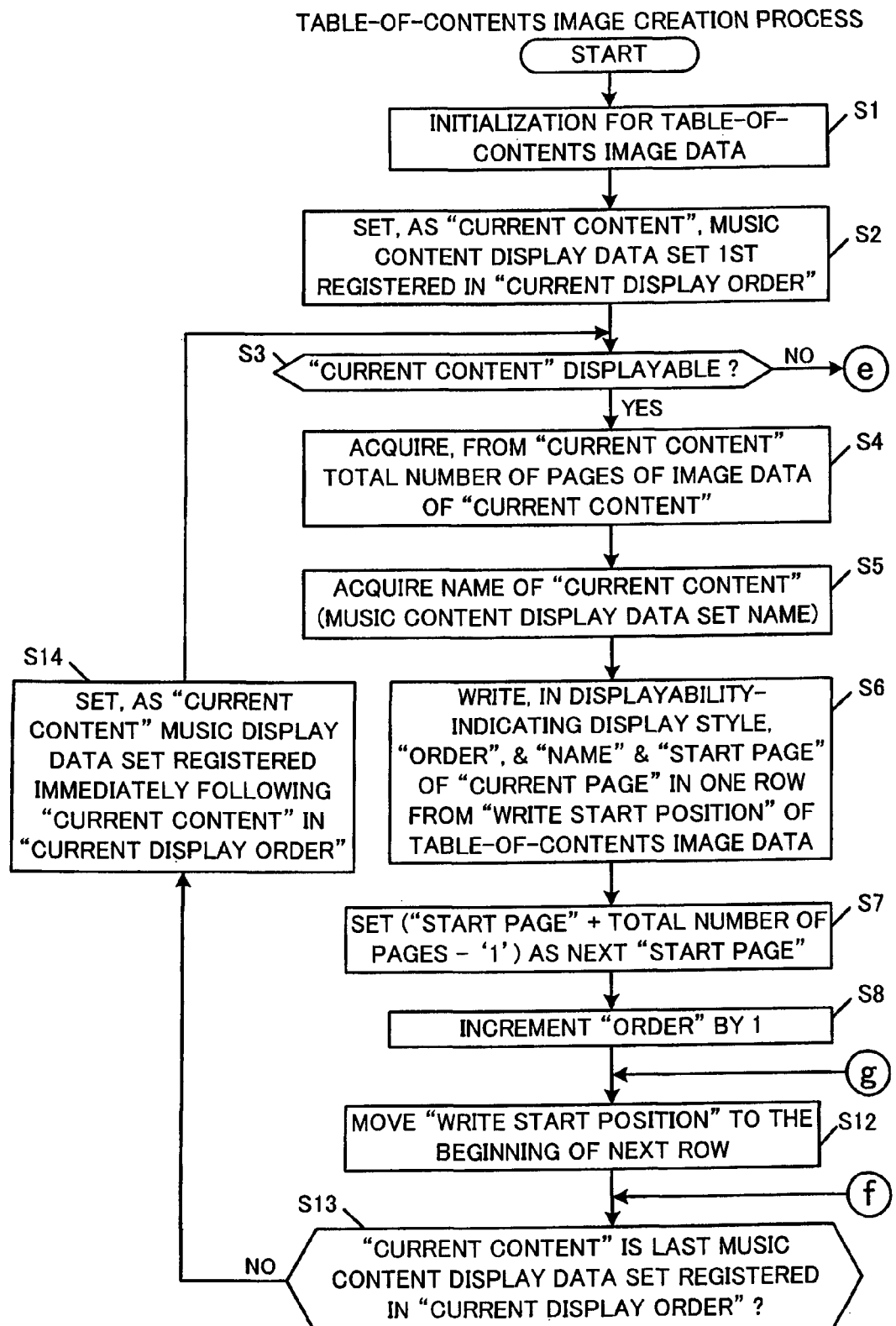
FIG. 11 is a flow chart showing a part of an example operational sequence of a table-of-contents page image creation process performed in the embodiment.
Figure 12:
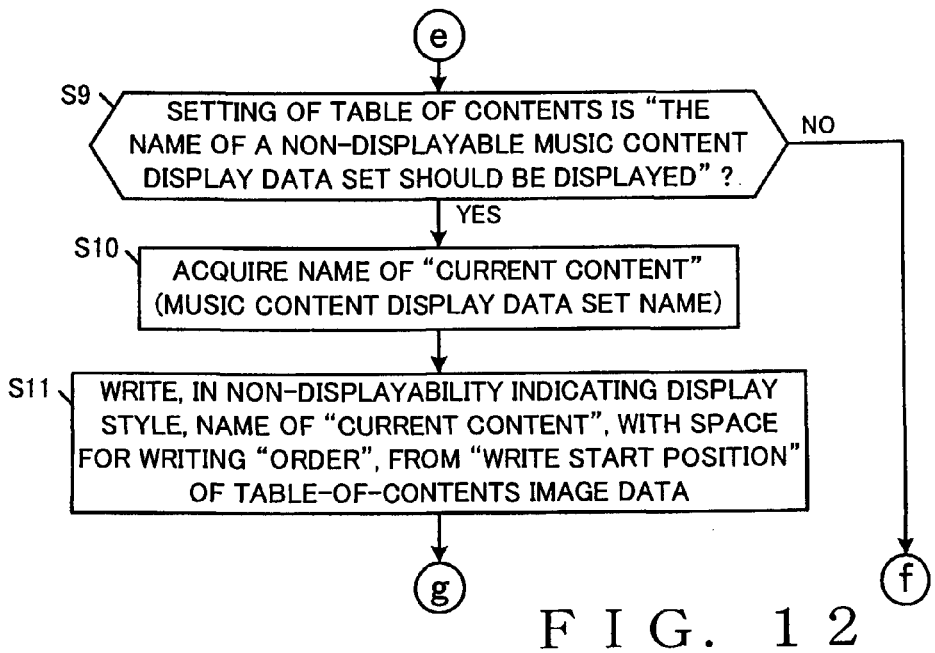
FIG. 12 is a flow chart showing the remaining part of the example operational sequence of the table-of-contents page image creation process.

FIGS. 11 and 12 are a flow chart showing an example operational sequence of the table-of-contents page image creation process performed at step R3 of the all-page image creation process of FIG. 9 and at step U5 (FIG. 16) of a later-described designated page display process performed at step T14 (FIG. 14) of a musical score page turning process of FIG. 13, where a legend in each double quotation mark ("") represents a variable. It is assumed here that the "current display order" has already been determined, and table-of-contents image data created by the instant table-of-contents page image creation process is stored until termination of the display or until the display order is changed.

At step S1 of FIG. 11, the CPU 1 performs initialisation for table-of-contents image data. In the initialization, the CPU 1, for example, secures a storage area for creation of table-of-contents image data, sets a "write start position" of table-of-contents image data, sets "start page" at "1", and sets "order" (Od) at "1". At next step S2, the music content display data set registered in the first position in the "current display order" is set as the "current content". Then, at step S3, a determination is made as to whether or not the "current content" is in the displayable state.

If the "current content" is in the displayable state (YES determination at step S3), the CPU 1 sequentially executes steps S4 to S8. Namely, the CPU 1 acquires, from the "current content", the total number of pages Pt of image data of the "current content" at step S4, and then acquires the name (music content display data set name) Ni of the "current content" at step S5 (note that the total number of pages Pt and the name Ni are acquirable from attribute information At of the current content Di or from analysis of image data Bd of the current content Di). Then, at step S6, the CPU 1 writes, in the displayability-indicating display style Hi (using solid lines, black color, etc.), the "order" (Od) and name Ni, "start page" (Pn) and total number of pages Pt of the "current content" in a row from the "write start position" of the table-of-contents image data Then, the ("start page+the total number of pages−1") is set as the next "start page" at step S7, and the "order" is incremented by "1" at step S8.

If, on the other hand, the "current content" is in the non-displayable state (NO determination at step S3), the CPU 1 goes to step S9 of FIG. 12, where a further determination is made as to whether or not the setting of a table of contents is "the name of a non-displayable music content display data set should also be displayed". With a YES determination, the CPU 1 proceeds to step S10 to acquire the name (music content display data set name) Ni of the "current content". At next step S11, the name Ni of the "current content" is written in the non-displayability-indicating display style Dk from the "write start position" of the table-of-contents image data with a space enough for writing the "order" (Od) therein formed immediately before the "write start position".

After completion of the operation of step S8 (FIG. 11) or step S11 (FIG. 12), the "write start position" is moved to the beginning of the next row (row following the "write start position") at step S12. After completion of the operation of step S12, or if the setting of a table of contents is not "the name of a non-displayable music content display data set should also be displayed" (NO determination at step S9), the CPU 1 proceeds to step S13 of FIG. 11, where a further determination is made as to whether or not the "current content" is the last music content display data set registered in the "current display order". If the "current content" is not the last music content display data set registered in the "current display order" (NO determination at step S13), the CPU 1 branches to step S14 to set the next music content display data set, registered in the "current display order" immediately following the "current content", as the "current content", after which the CPU 1 reverts to step S3.

If the "current content" is not the last music content display data set registered in the "current display order" (NO determination at step S13), the CPU 1 repeats the operations of steps S3 to S14. Then, once the "current content" becomes the last music content display data set registered in the "current display order" (YES determination at step S13), the CPU 1 outputs table-of-contents image data to the display 6 and then terminates the instant table-of-contents image data creation process, after which it reverts to step R4 of the all-page image creation process (FIG. 9).

The aforementioned arrangements for causing the CPU 1 to execute the program (group of instructions) related to steps S4 to S14 of FIGS. 11 and 12 correspond to or constitute a "table-of-contents image creation section" adapted to display, as a table-of-contents image on the display 6, a list of two or more music content items whose order has been determined by the "order determination section". In this case, the aforementioned arrangements for causing the CPU 1 to execute the program (group of instructions) related to steps S6 and S9 to S11 of FIGS. 11 and 12 correspond to the "table-of-contents image creation section" differentiating the display style, in the table-of-contents image, of each music content item determined by the determination section to be non-displayable among the two or more music content items from the display style, in the table-of-contents image, of each music content item determined by the determination section to be displayable among the two or more music content items.

[Musical Score Page Turning Process]

Figure 13:
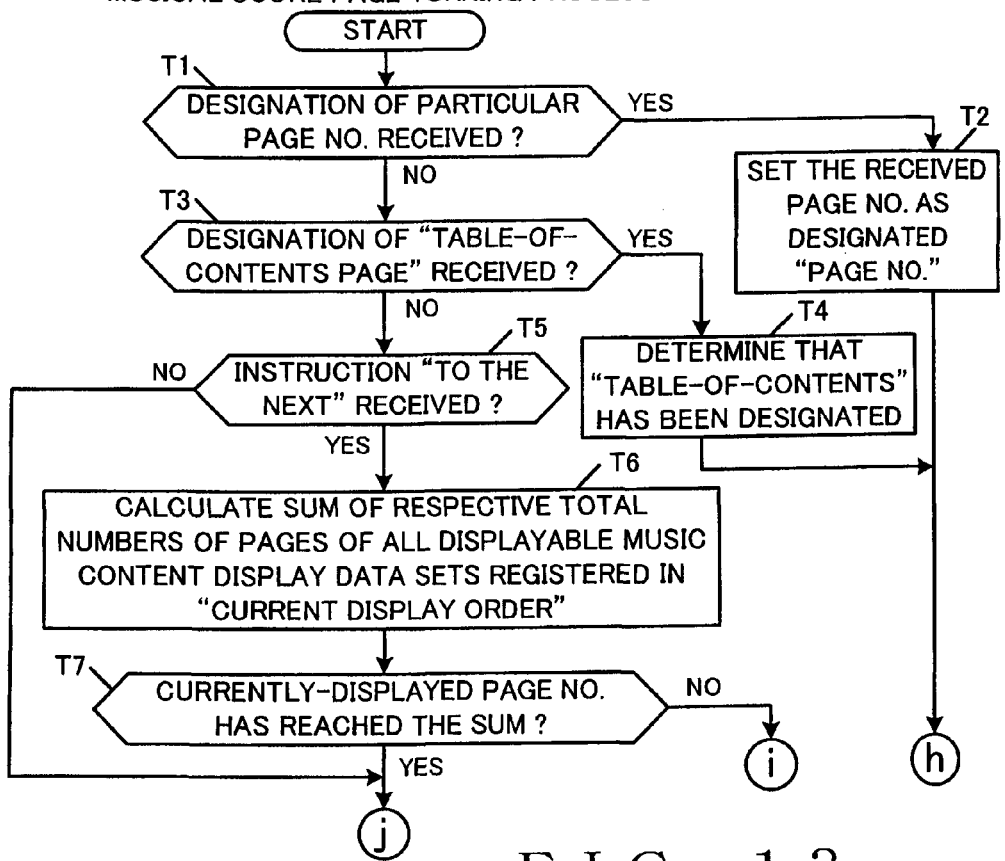
FIG. 13 is a flow chart showing a part of an example operational sequence of a musical score page turning process performed in the embodiment.
Figure 14:
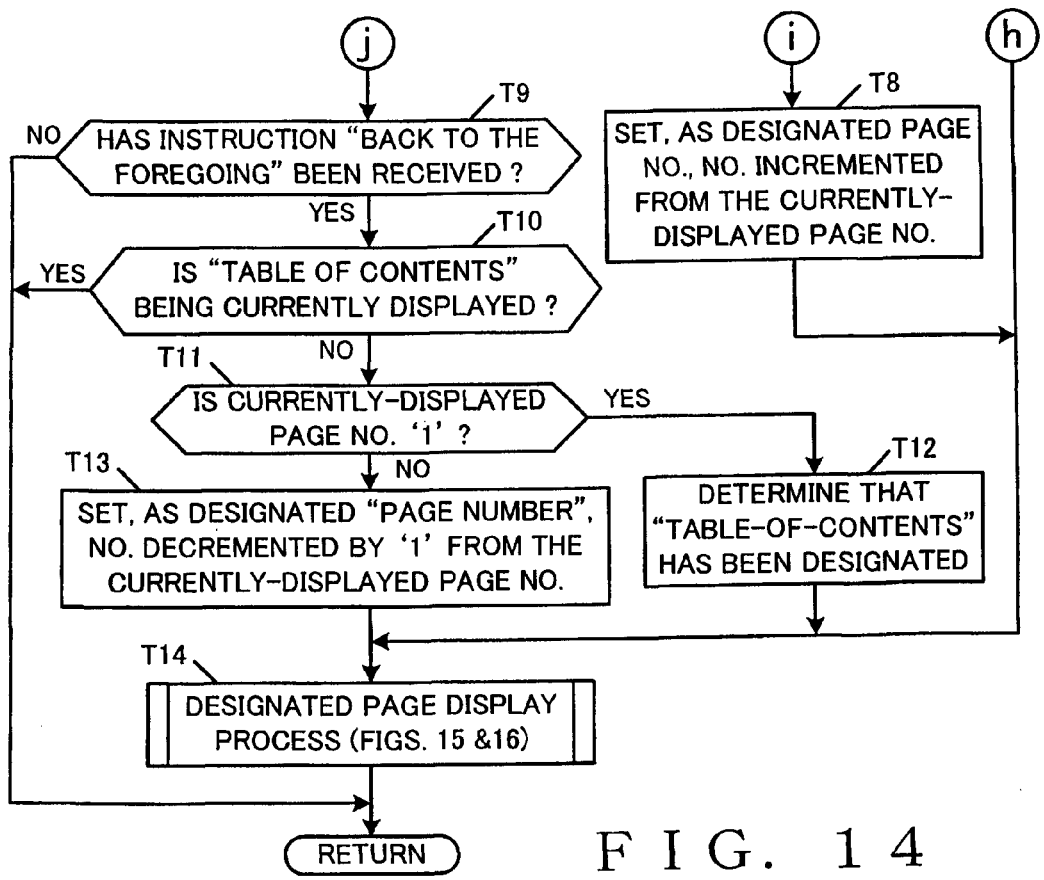
FIG. 14 is a flow chart showing the remaining part of the example operational sequence of the musical score page turning process.

FIGS. 13 and 14 are a flow chart showing an example operational sequence of the musical score page turning process performed at step P10 of the music content display processing of FIG. 6, which particularly shows behavior in the case where a table of contents is to be displayed and the "page-by-page display mode" is set. In this processing flow, a legend in each double quotation mark ("") represents a variable or a setting, and it is assumed here that the "current display order" has already been determined. Once the musical score page turning process is started, the CPU 1 determines, at step T1, whether or not designation of a particular page number has been received, for example, via a table-of-contents display screen (including direct input via a numeric keypad). If designation of a particular page number has been received (YES determination at step T1), the received particular page number is set as a designated "page number" at step T2.

If, on the other hand, designation of a particular page number has not been received (NO determination at step T1), a further determination is made, at step T3, as to whether designation of a "table-of-contents page" has been received. If designation of a "table-of-contents page" has been received (YES determination at step T3), it is determined, at step T4, that a "table-of-contents" has been designated.

If, on the other hand, designation of a "table-of-contents page" has not been received (NO determination at step T3), the CPU 1 proceeds to step T5, where a further determination is made as to whether a musical score page turning instruction "to the next" has been received. If a musical score page turning instruction "to the next" has been received (YES determination at step T5), the CPU 1 moves on to step T6 to calculate a sum of the respective total numbers of pages of all displayable music content display data sets registered in the "current display order", and then it proceeds to step Ti. In the case where the "two-page spread display mode" is set, musical score page turning "to the next" is permitted as long as the currently-displayed page number is less than "the sum −1" when the sum is an even number, or as long as the currently-displayed page number is less than the sum when the sum is an odd number.

Further, a determination is made, at step T7, as to whether the currently-displayed page number is equal to, or has reached, the sum of the respective total numbers of pages (at which time the musical score page turning "to the next" may be made no longer selectable). If the currently-displayed page number has not yet reached the sum (NO determination at step T7), the CPU 1 proceeds to step T8 of FIG. 14, where a number obtained by adding "1" to the currently-displayed page number is set as the "page number" (behavior in the "two-page spread display mode" will be described later).

If a musical score page turning instruction "to the next" has not been received (NO determination at step T5), or if the currently-displayed page number has reached the sum (YES determination at step T7), the CPU 1 proceeds to step T9 of FIG. 14, where a further determination is made as to whether or not a musical score page turning instruction "back to the preceding" has been received (note that such a musical score page turning instruction "back to the preceding" may be made unselectable when the "table of contents" is being displayed). If a musical score page turning instruction "back to the preceding" has been received (YES determination at step T9), a further determination is made, at step T10, as to whether the "table of contents" is being currently displayed (note that, in the "two-page spread display mode", it is determined that a table-of-contents has been designated even when the currently-displayed page number is "2"). If such a musical score page turning instruction "back to the preceding" has not been received (NO determination at step T9), or when the "table of contents" is being currently displayed (YES determination at step T10), the CPU 1 terminates the instant musical score page turning process and reverts to step P6 of the music content display processing of FIG. 6.

Further, if a "table of contents" is not being displayed (NO determination at step T10) when a musical score page turning instruction "back to the preceding" has been received (YES determination at step T9), the CPU 1 goes to step T11 to further determine whether the currently-displayed page number is "1". If the currently-displayed page number is "1" (YES determination at step T11), the CPU 1 goes to step T12, where it is determined that a "table of contents" has been designated. If, on the other hand, the currently-displayed page number is not "1" (NO determination at step T11), the CPU 1 proceeds to step T13, where a number obtained by subtracting "1" from the currently-displayed page number is set as a designated "page number" (behavior in the "two-page spread display mode" will be described later).

Figure 15:
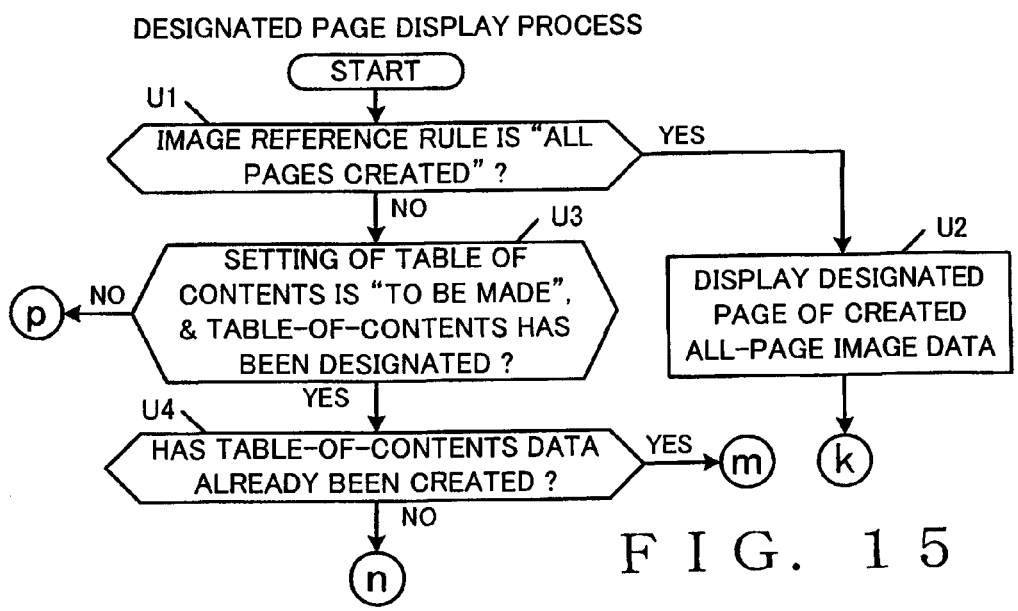
FIG. 15 is a flow chart showing a part of an example operational sequence of a designated page display process performed in the embodiment.
Figure 16:
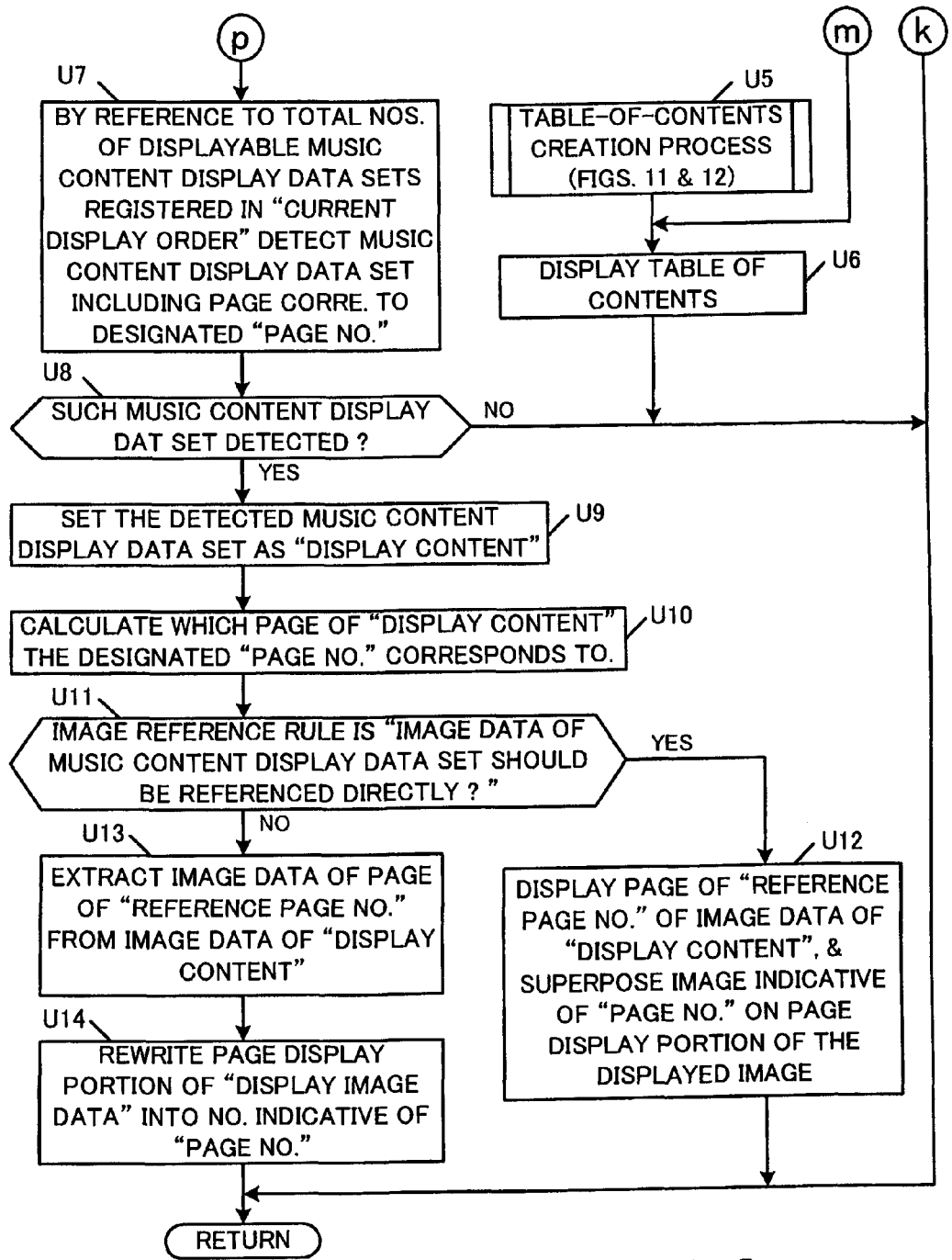
FIG. 16 is a flow chart showing the remaining part of the example operational sequence of the designated page display process.

After the page designation operation of step T2, T4, T8, T12 or T13, the CPU 1 performs a "designated page display process" at step T14 (see FIGS. 15 and 16). After that, the CPU 1 terminates the musical score page turning process and reverts to step P7 of the music content display processing of FIG. 6.

The aforementioned arrangements for causing the CPU 1 to execute the program (group of instructions) related to steps T1 to T14 of FIGS. 13 and 14 correspond to or constitute a "page number acquisition section" that is adapted to acquire page information designating a page to be displayed.

<Designated Page Display Process>

FIGS. 15 and 16 are a flow chart showing an example operational sequence of the designated page display process performed at step T14 (FIG. 14) of the musical score page turning process. In this processing flow, a numerical value of a "page number" to be displayed or a "table of contents" to be displayed is designated in response to page designation from a table of contents (step T2), designation of a "table of contents" (step T4) in the case where the setting of a table of contents is "to be made", designation of a page number calculated at the time of detection of a musical score page turning instruction (YES determination at step T5 or YES determination at step T9) or designation of a table of contents (step T8, T12 or T13), or page designation based on a user's operation or the like (step T2). Further, in the processing flow, the "page-by-page display mode" is set, a legend in each double quotation mark ("") represents a variable, and it is assumed that the "current display order" has already been determined.

Once the designated page display process is started, the CPU 1 determines, at first step U1, whether or not the image reference rule is "image data created for all pages should be referenced in a display order". If so (YES determination at step U1), the CPU 1 goes to step U2, where the image data of the designated page is selected from the created all-page image data and displayed on the screen Sc of the display 6.

If, on the other hand, the image reference rule is not "image data created for all pages in display order should be referenced in a display order" (NO determination at step U1), a further determination is made, at step U3, as to whether or not the setting of a table of contents is "to be made" and a table of contents has been designated (note that a table of contents is not designated in the case where the setting of a table of contents is "to be not made"). If the setting of a table of contents is "to be made" (YES determination at step U3), the CPU 1 moves on to step U4 to further determine whether table-of-contents image data has already been created. If table-of-contents image data has not yet been created (NO determination at step U4), the CPU 1 goes to step U5 of FIG. 16, where the table-of-contents page image creation process (see FIGS. 11 and 12) is performed to create table-of-contents page image data. If table-of-contents image data has already been created (YES determination at step U4), or after completion of the operation of step U5, the CPU 1 proceeds to step U6 to display the table-of-contents (image) on the screen Sc.

If a content page has been designated as determined at step U3 (FIG. 15) (NO determination at step U3), the CPU 1 proceeds to step U7 (FIG. 16), where the total numbers of displayable music content display data sets registered in the "current display order" are referenced to detect a music content display data set including the page corresponding to the designated "page number". At next step U8, a determination is made as to whether such a music content display data set corresponding to the designated "page number" has been detected. If such a music content display data set has not been detected (NO determination at step U8), the CPU 1 displays an error message to the effect that the music content display data set corresponding to the designated "page number" has not been detected, then terminates the instant designated page display process and the musical score page turning process and then reverts to step P7 of the music content display processing of FIG. 6.

If, on the other hand, the music content display data set corresponding to the designated "page number" has been detected (YES determination at step U8), the CPU 1 proceeds to step U9 to set the detected music content display data set as "display content". At next step U10, the CPU 1 calculates which page of the "display content" the designated "page number" corresponds to. For example, if a "ninth page" of album "A-All" shown in FIG. 3 has been designated, the "display content" is music piece "04CCC", and a "reference page number" is "2". At next step U11, a determination is made as to whether or not the image reference rule is "image data of a music content display data set should be referenced directly". If so (YES determination at step U11), the CPU 1 goes to step U12, where a content page corresponding to the "reference page number" of the image data of the "display content" is displayed on the screen Sc and an image indicative of a "page number" is superposed on (written over) a page display portion of the displayed image.

If, on the other hand, the image reference rule is not "image data of a music content display data set should be referenced directly" (NO determination at step U11), the CPU 1 proceeds to step U13, where the content page corresponding to the "reference page number" is extracted from the image data of the "display content" to thereby create "display image data". At next step U14, the page display portion of the created "display image data" is rewritten into a number indicative of a "page number" and displayed on the screen Sc; note that such rewriting is not necessary if the page number previously written in the display portion is the same as the "page number".

After completion of the display operation of step U2, U6, U12 or U14, the CPU 1 terminates the designated page display process and the musical score page turning process and then reverts to step P7 of the music content display processing of FIG. 6. Note that, if another image is being displayed when the designated page is to be displayed at step U2, U6, U12 or U14, display update is performed.

<Example Display in the "Two-page Spread Display Mode">

When a musical score is to be displayed in the two-page spread display mode rather than in the page-by-page display mode, it is displayed as follows.

(1) If a table-of-contents page is to be displayed, it is displayed after being laid out in a two-page spread format.

(2) If the designated "page number" is an odd number, image data of a page corresponding to the designated "pge number" is positioned and displayed on the left-side portion, and image data corresponding to a page immediately following the designated "page number" is retrieved or create and displayed to the right of the page displayed on the left-side portion. In displaying the image data, an adjustment is made of the page number display as necessary such that a page whose page number portion of the image data is located on the left-side portion takes the designated "page number" while a page whose page number portion of the image data is located on the right-side portion takes a page number immediately following the designated "page number".

(3) If the designated "page number" is an even number, image data of a page corresponding to the designated "page number" is positioned and displayed on the right-side portion, and image data corresponding to a page immediately preceding the designated "page number" is referenced or create and displayed to the left of the page displayed on the right-side portion. In displaying the image data, an adjustment is made of the page number display as necessary such that a page whose page number portion of the image data is located on the right-side portion takes the designated "page number" while a page whose page number portion of the image data is located on the left-side portion takes a page number immediately preceding the designated "page number".

(4) If the currently-displayed page number is an odd number and when a musical score page turning instruction "to the next" has been given, an odd-number page two pages forward is displayed on the left-side portion and an even-number page three pages forward is displayed to the right of the odd-number page. If the currently-displayed page number is an even number and when a musical score page turning instruction "to the next" has been given, an odd-number page one page forward is displayed on the left-side portion and an even-number page two pages forward is displayed to the right of the odd-number page.

(5) If the currently-displayed page number is an odd number and when a musical score page turning instruction "back to the preceding" has been given, an odd-number page two pages backward is displayed on the left-side portion and an even-number page one page backward is displayed to the right of the odd-number page. If the currently-displayed page number is an even number and when a musical score page turning instruction "back to the preceding" has been given, an odd-number page three pages backward is displayed on the left-side portion and an even-number page two pages backward is displayed to the right of the odd-number page.

The aforementioned arrangements for causing the CPU 1 to execute the program (group of instructions) related to steps U7 to U10 of FIG. 16 correspond to or constitute a "page identification section" which references the storage section (storage device 4) to specify a page arrangement indicative of a state in which the image data of the two or more music content items (Di), whose order has been determined by the "order determination section", are arranged in a consecutive fashion in accordance with the determined order, and which identifies, in the specified page arrangement, a page designated by the acquired page number information.

Further, the aforementioned arrangements for causing the CPU 1 to execute the program (group of instructions) related to steps U11 to U13 of FIG. 16 correspond to or constitute a "display control section" adapted to acquire the image data of the identified page on the basis of the storage section (storage device 4) and displays the acquired image data on the display 6. In this case, the arrangements for causing the CPU 1 to execute the program (group of instructions) related to steps U11 to U13 of FIG. 16 correspond to the "display control section" extracting the image data of the identified page from the storage section (storage device 4).

Further, the aforementioned arrangements for causing the CPU 1 to execute the program (group of instructions) related to step U2 of FIG. 15 and steps R8 to R11 of FIG. 10 also correspond to or constitute the "display control section" adapted to acquire the image data of the identified page on the basis of the storage section (storage device 4) and displays the acquired image data on the display 6. In this case, the arrangements for causing the CPU 1 to execute the program (group of instructions) related to steps R8 to R11 of FIG. 10 correspond to the "display control section" retrieving, from the storage section, the two or more music content items, then creating an image data set comprising the image data of the retrieved two or more music content items arranged in the specified page arrangement and then extracting the image data of the identified page from the created image data set.

Furthermore, the aforementioned arrangements for causing the CPU 1 to execute the program (group of instructions) related to step R6 of FIG. 10 correspond to or constitute a "determination section" adapted to determine the displayable or non-displayable state of each of the music content items (Di) stored in the storage section (storage device 4). In this connection, the aforementioned arrangements for causing the CPU 1 to execute the program (group of instructions) related to step U7 of FIG. 16 and steps R7 to R12 correspond to the "page identification section" specifying the page arrangement indicative of a state in which image data of one or more music content items determined by the "determination section" to be displayable among the two or more music content items, whose order has been determined by the "order determination section", are arranged in a consecutive fashion in accordance with the determined order.

Further, the aforementioned arrangements for causing the CPU 1 to execute the program (group of instructions) related to step R10 of FIG. 10 and steps U12 and U14 of FIG. 16 also correspond to the "display control section" displaying, on the display 6, the image data of the identified page acquired from the storage section (storage device 4) and having added thereto the page number, designated by the acquired page number information,.

[Various Modifications and Supplementary Notes]

Whereas the foregoing has described specific examples of the music content display of the present invention with reference to the accompanying drawings, the present invention is not so limited and may be modified variously as set forth hereinbelow. For example, whereas each music content display data set Di has been described as being music content display data of a single music piece, it may be some type of page-by-page display data set pertaining to the one music piece; for example, it may comprises picture-card-show-like, music-piece guiding illustration data corresponding to a music piece.

Further, the display screen may be in the form of a touch panel or a screen including buttons and/or other operators provided therearound. Alternatively, the display screen may be of a type which includes operators provided thereon for instructing selection, decision, etc. so that the user can give a desired instruction by operating any of the operators via a cursor or the like.

Further, whereas the preferred embodiment has been described above in relation to the case where created table-of-contents image data is stored until the display is terminated or the display order is changed, the present invention is not so limited. For example, the created table-of-contents image data may be stored in association with a corresponding group data set Dg. In such a case, the table-of-contents image data is revised in content as the group data set Dg is changed. Further, on a table-of-contents page, music content display data sets (musical score display data sets) stored in the non-displayable state need not be listed up (displayed) or may be displayed in a different display style such that it can be visually seen that they are not selectable (displayable).

In the foregoing description of the preferred embodiment, the "page-by-page" display was explained in details, while the "two-page spread display" was explained briefly with reference to FIGS. 4 and 5 and in relation to the "musical score page turning process" (FIGS. 13 to 16). Note, however, that the above-described basic principles of the present invention are also applicable to spread displays of three or more pages.

In another modification, music content reproducing data sets (music reproducing data sets) corresponding to music content display data sets (musical score display data sets) Di registered in a group data set Dg may be stored or prepared in advance in an accessible state. In such a case, arrangements may be made such that visual display of a musical score and audible reproduction of corresponding music are performed in interlocked relation or in synchronism with each other, and such arrangements may be implemented in a music content reproduction apparatus provided with a display screen, an electronic musical instrument provided with a display screen, or the like. Alternatively, the visual display and the audible reproduction may be performed by different apparatus (i.e., display apparatus and reproduction apparatus), in which case, for example, the display apparatus may receive a musical score page turning signal from the reproduction apparatus to thereby control the musical score display. For example, a group data set Dg may include information identifying each music content display data set (musical score display data set) Di registered therein for musical core display so that, during display of image data (musical score data), reproduction of music can be effected in synchronism with the image data display.

Further, the musical score page turning instruction based on a user's operation may be given as follows. Namely, a musical score page turning instruction "back to the preceding" may be given in response to the user touching a left end area of the display screen during musical score display of a group data set Dg, and a musical score page turning instruction "to the next" may be given in response to the user touching a right end area of the display screen during musical score display based on a group data set Dg. Alternatively, user-operable "back to the preceding" and "to the next" buttons may be provided in or near the display screen. Further, arrangements may be made to allow the user to directly designate, via a numeric keypad or the like, a page to be displayed.

Furthermore, in the case where the musical score page turning is to be effected in synchronism with reproduction of the music piece, page switching timing may be determined on the basis of a reproduced position of the music piece being reproduced. In a case where a musical score page turning signal responsive to audible reproduction of music is received, a page in a currently-displayed album (image data) is detected on the basis of a page of a musical score (display data) designated by the received musical score page turning signal.

In still another alternative, a predetermined signal from, or a predetermined operation of, an electronic musical instrument provided with a performance operator may be detected and interpreted as a musical score page turning, independently of reproduction of a music piece. For example, musical score page turning instruction may be effected in response to information output when a given operator of the electronic musical instrument has been output, such as pedal ON/OFF information, detection information indicative of depression of a particular key or keys that are not used in a normal performance (such as simultaneous depression of two keys of the highest pitch and second highest pitch of a keyboard).

Furthermore, whereas the preferred embodiment of the present invention has been described above as detecting a page number designated primarily on the basis of a table of contents or a musical score page turning operation, the present invention may be arranged to detect a page number designated directly by the user via a numeric keypad or the like.

Note that, in the initialization operation performed at step P1 of FIG. 6, the display order determination rule may be set in response to "user's designation" or "automatically". In such a case, a selection menu similar to that described in relation to step Q1 of FIG. 7 may be presented at initializing step P1 to prompt the user to select any one of items (1) to (4). Although step Q1 of FIG. 7 may be omitted, it may be left unomitted for allowing the user to change as necessary the initially-set display order determination rule.

This application is based on, and claims priority to, JP PA 2012-063272 filed on 21 Mar. 2012. The disclosure of the priority application, in its entirety, including the drawings, claims, and the specification thereof, are incorporated herein by reference.

What is claimed is:

1. A music content display apparatus comprising:
   a storage section storing a plurality of music content items, each of the plurality of music content items including image data of one or more pages;
   an order determination section adapted to determine an order of two or more of the plurality of music content items stored in said storage section;
   a page number acquisition section adapted to acquire page information designating a page to be displayed;
   a page identification section adapted to reference said storage section to specify a page arrangement indicative of a state in which the image data of the two or more music content items, whose order has been determined by said order determination section, are arranged in a consecutive fashion in accordance with the determined order, and adapted to identify, in the specified page arrangement, a page designated by the page number information acquired by said page number acquisition section; and
   a display control section adapted to acquire image data of the page, identified by said page identification section, on the basis of said storage section and display the acquired image data on a display.

2. The music content display apparatus as claimed in claim 1, wherein said display control section extracts the image data of the designated page from said storage section.

3. The music content display apparatus as claimed in claim 1, wherein said display control section:
   retrieves, from said storage section, the two or more music content items whose order has been determined by said order determination section;
   creates an image data set comprising the image data of the retrieved two or more music content items arranged consecutively in the specified page arrangement; and
   acquires the image data of the identified page from the created image data set.

4. The music content display apparatus as claimed in claim 1, further comprising:
   a determination section adapted to determine whether each of the music content items stored in said storage section is in a displayable state,
   wherein said page identification section specifies the page arrangement indicative of a state in which the image data of one or more music content items determined by said determination section to be in the displayable state among the two or more music content items, whose order has been determined by said order determination section, are arranged in a consecutive fashion in accordance with the determined order.

5. The music content display apparatus as claimed in claim 1, wherein said order determination section:
   includes a group data table storing therein one or more group data sets each defining a combination and display order of two or more of the plurality of music content items stored in said storage section; and
   determines, in accordance with the combination and display order of the two or more music content items defined by one of the group data sets selected from the group data table, an order of the two or more music content items.

6. The music content display apparatus as claimed in claim 1, wherein said order determination section:
   creates, in response to a user's operation, a group data set defining a combination and display order of two or more of the plurality of music content items stored in said storage section; and
   determines, in accordance with the combination and display order of the two or more music content items defined by the created group data set, an order of the two or more music content items.

7. The music content display apparatus as claimed in claim 1, wherein said display control section displays, on the display, the image data of the identified page acquired from the storage section and having added thereto the page number designated by the page number information acquired by said page number acquisition section.

8. The music content display apparatus as claimed in claim 5, further comprising an editing section adapted to:
   select, in response to a user's operation, at least one desired group data set from among the one or more group data sets stored in the group data table; and
   edit, in response to a user's operation, at least one of the combination or display order of the music content items defined by the selected desired group data set.

9. The music content display apparatus as claimed in claim 8, wherein editing performed by said editing section is at least one of:
   dividing a plurality of the music content items, defined by one selected group data set, into two or more new groups;
   compiling a plurality of the music content items, defined by two or more selected group data sets, into one new group;
   deleting any of a plurality of the music content items defined by one selected group data set;
   adding another music content item to a combination of the music content items defined by one selected group data set; or
   changing a display order defined by one selected group data set.

10. The music content display apparatus as claimed in claim 4, further comprising a table-of-contents image creation section adapted to display, as a table-of-contents image on the display, a list of two or more music content items whose order has been determined by said order determination section.

11. The music content display apparatus as claimed in claim 10, wherein, of the two or more music content items whose order has been determined by said order determination section, said table-of-contents image creation section differentiates a display style, in the table-of-contents image, of each music content item determined by said determination section to be not in the displayable state from a display style, in the table-of-contents image, of each music content item determined by the determination section to be in the displayable state.

12. A method of displaying music content stored in a storage section storing a plurality of music content items, each of the plurality of music content items including image data of one or more pages, the method comprising:
   an order determination step of determining an order of two or more of the plurality of music content items stored in the storage section;
   a page number acquisition step of acquiring page information designating a page to be displayed;
   a page identification step of referencing the storage section to specify a page arrangement indicative of a state in which the image data of the two or more music content items, whose order has been determined by said order determination step, are arranged in a consecutive fashion in accordance with the determined order, and identifying, in the specified page arrangement, a page designated by the page number information acquired by said page number acquisition step; and
   a display step of acquiring image data of the page, identified by said page identification step, on the basis of the storage section and displaying the acquired image data on a display.

13. A non-transitory computer-readable recording medium storing a computer program executable by a computer to execute a method of displaying music content stored in a storage section storing a plurality of music content items, each of the plurality of music content items including image data of one or more pages, the method comprising:
   an order determination step of determining an order of two or more of the plurality of music content items stored in the storage section;
   a page number acquisition step of acquiring page information designating a page to be displayed;
   a page identification step of referencing the storage section to specify a page arrangement indicative of a state in which the image data of the two or more music content items, whose order has been determined by said order determination step, are arranged in a consecutive fashion in accordance with the determined order, and identifying, in the specified page arrangement, a page designated by the page number information acquired by said page number acquisition step; and
   a display step of acquiring image data of the page, identified by said page identification step, on the basis of the storage section and displaying the acquired image data on a display.

14. The non-transitory computer-readable recording medium as claimed in claim 13, wherein said display step extracts the image data of the designated page from the storage section.

15. The non-transitory computer-readable recording medium as claimed in claim 13, wherein said display step:
   retrieves, from the storage section, the two or more music content items whose order has been determined by said order determination step;
   creates an image data set comprising the image data of the retrieved two or more music content items arranged consecutively in the specified page arrangement; and
   acquires the image data of the identified page from the created image data set.

16. The non-transitory computer-readable recording medium as claimed in claim 13, further comprising:
   a determination step of determining whether each of the music content items stored in the storage section is in a displayable state,
   wherein said page identification step specifies a page arrangement indicative of a state in which the image data of one or more music content items determined by said determination step to be in the displayable state among the two or more music content items, whose order has been determined by said order determination step, are arranged in a consecutive fashion in accordance with the determined order.

17. The non-transitory computer-readable recording medium as claimed in claim 13, wherein said order determination step:
   references a group data table storing therein one or more group data sets each defining a combination and display order of two or more of the plurality of music content items stored in said storage section; and
   determines, in accordance with the combination and display order of the two or more music content items defined by one of the group data set selected from the group data table, an order of the two or more music content items.

18. The non-transitory computer-readable recording medium as claimed in claim 13, wherein said order determination step:
   creates, in response to a user's operation, a group data set defining a combination and display order of two or more of the plurality of music content items stored in said storage section; and
   determines, in accordance with the combination and display order of the two or more music content items defined by the created group data set selected from the group data table, an order of the two or more music content items.

19. The non-transitory computer-readable recording medium as claimed in claim 13, wherein said display step displays, on the display, the image data of the identified page acquired from the storage section and having added thereto the page number designated by the page number information acquired by said page number acquisition step.

20. The non-transitory computer-readable recording medium as claimed in claim 17, wherein the method further comprises an editing step of:
   selecting, in response to a user's operation, at least one desired group data set from among the one or more group data sets stored in the group data table, and
   editing, in response to a user's operation, at least one of the combination and display order of the music content items defined by the selected desired group data set.

21. The non-transitory computer-readable recording medium as claimed in claim 20, wherein editing performed by said editing step is at least one of:
   dividing a plurality of the music content items, defined by one selected group data set, into two or more new groups;
   compiling a plurality of the music content items, defined by two or more selected group data sets, into one new group;
   deleting any of a plurality of the music content items defined by one selected group data set;
   adding another music content item to a combination of the music content items defined by one selected group data set; or
   changing a display order defined by one selected group data set.

22. The non-transitory computer-readable recording medium as claimed in claim 16, wherein the method further comprises a table-of-contents image creation step of displaying, as a table-of-contents image on the display, a list of two or more music content items whose order has been determined by said order determination step.

23. The non-transitory computer-readable recording medium as claimed in claim 22, wherein, of the two or more music content items whose order has been determined by said order determination step, said table-of-contents image creation step differentiates a display style, in the table-of-contents image, of each music content item determined by said determination step to be not in the displayable state from a display style, in the table-of-contents image, of each music content item determined by the determination step to be in the displayable state.

* * * * *